US012797721B2

(12) United States Patent
Nakada et al.

(10) Patent No.: US 12,797,721 B2
(45) Date of Patent: Nov. 17, 2026

(54) NON-TRANSITORY STORAGE MEDIUM, INFORMATION PROCESSING METHOD, AND INFORMATION PROCESSING SYSTEM

(71) Applicant: NINTENDO CO., LTD., Kyoto (JP)

(72) Inventors: Ryuichi Nakada, Kyoto (JP); Akira Kinashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 279 days.

(21) Appl. No.: 18/606,634

(22) Filed: Mar. 15, 2024

(65) Prior Publication Data

US 2025/0010182 A1 Jan. 9, 2025

(30) Foreign Application Priority Data

Jul. 4, 2023 (JP) ................................ 2023-110297

(51) Int. Cl.
*A63F 13/50* (2014.01)
*A63F 13/45* (2014.01)
*A63F 13/795* (2014.01)

(52) U.S. Cl.
CPC ............. *A63F 13/45* (2014.09); *A63F 13/50* (2014.09); *A63F 13/795* (2014.09)

(58) Field of Classification Search
None
See application file for complete search history.

(56) References Cited

U.S. PATENT DOCUMENTS

2008/0254813 A1 10/2008 Kano et al.
2010/0060649 A1* 3/2010 Haggar ................. A63F 13/795 345/474
2015/0246284 A1* 9/2015 Taoka ..................... A63F 13/87 463/31
2016/0136523 A1* 5/2016 Yano ..................... A63F 13/355 463/31
2018/0353860 A1 12/2018 Nakamura et al.
2022/0070066 A1 3/2022 Tokuchi
(Continued)

FOREIGN PATENT DOCUMENTS

JP 2008270913 A 11/2008
JP 2014239913 A 12/2014
JP 2019000219 A 1/2019
(Continued)

*Primary Examiner* — Damon J Pierce

(74) *Attorney, Agent, or Firm* — Scully, Scott, Murphy & Presser, P.C.

(57) ABSTRACT

Information processing instructions to be executed by a computer of a first terminal of a first user cause the computer to participate in a session and run a game via a network, and to perform operations of: updating game status based on an operation input from the first user; when positions of a first character controlled in a virtual space of the game by the first user and a second character controlled in the virtual space by a second user of a second terminal participating in the same session as the first terminal get closer than a predetermined criterion, establishing a predetermined relationship in the session between the first user and the second user; and during progress of the game, successively outputting information indicating game status of the second user updated based on an operation input from the second user whose predetermined relationship with the first user has been established.

20 Claims, 22 Drawing Sheets

| Session ID | Elapsed time T1 | Elapsed time T2 | Participation capacity | Participant user | Number of open slots |
|---|---|---|---|---|---|
| S0001 | 75 minutes | - | First participation capacity | U1234<br>U2332<br>.<br>. | 3 |
| | | | Second participation capacity | U5237<br>U3672<br>.<br>. | 50 |
| S0002 | 50 minutes | 5 minutes | First participation capacity | - | 10 |
| | | | Second participation capacity | - | 90 |
| . . . | . . . | . . . | . . . | . . . | . . . |

(56) References Cited

U.S. PATENT DOCUMENTS

| | | | |
|---|---|---|---|
| 2022/0379216 | A1 | 12/2022 | Garriss et al. |

FOREIGN PATENT DOCUMENTS

| | | | |
|---|---|---|---|
| JP | 2020168109 | A | 10/2020 |
| JP | 2022042227 | A | 3/2022 |
| JP | 2022043099 | A | 3/2022 |
| JP | 2023522581 | A | 5/2023 |
| WO | 2014196135 | A1 | 12/2014 |
| WO | 2017218305 | A1 | 12/2017 |

* cited by examiner

FIG. 6

| Session ID | Elapsed time T1 | Elapsed time T2 | Participant user | Number of open slots |
|---|---|---|---|---|
| S0001 | 75 minutes | — | U1234<br>U2332<br>⋮ | 20 |
| S0002 | 50 minutes | 5 minutes | None | 100 |
| ⋮ | ⋮ | ⋮ | ⋮ | ⋮ |

*FIG. 13*

| Session ID | Elapsed time T1 | Elapsed time T2 | Participation capacity | Participant user | Number of open slots |
|---|---|---|---|---|---|
| S0001 | 75 minutes | – | First participation capacity | U1234<br>U2332<br>·<br>· | 3 |
| | | | Second participation capacity | U5237<br>U3672<br>·<br>· | 50 |
| S0002 | 50 minutes | 5 minutes | First participation capacity | – | 10 |
| | | | Second participation capacity | – | 90 |
| ⋮ | ⋮ | ⋮ | ⋮ | ⋮ | ⋮ |

FIG. 17

| User ID | Time | Online |
| --- | --- | --- |
| U3285 | 20:21:28 | ○ |
| U0282 | 20:40:51 | ○ |
| ⋮ | ⋮ | ⋮ |

NON-TRANSITORY STORAGE MEDIUM, INFORMATION PROCESSING METHOD, AND INFORMATION PROCESSING SYSTEM

CROSS REFERENCE TO RELATED APPLICATION

This nonprovisional application is based on Japanese Patent Application No. 2023-110297 filed with the Japan Patent Office on Jul. 4, 2023, the entire contents of which are hereby incorporated by reference.

FIELD

The present disclosure relates to information processing of a game participated in by users of a plurality of user terminals.

BACKGROUND AND SUMMARY

Conventionally, there have been known games in which a user performs multiplay with other users (Japanese Patent Laid-Open Application No. 2019-000219). The invention described in this document allows for sending an invitation message to a smartphone, a tablet terminal, or the like so that a person on the other end can be invited to multiplay even when the person's game apparatus is not online.

Examples of a destination of such an invitation message cited in the document are a user whose real contact information is known, a friend user in a game, and a user with whom multiplay has been performed in the past.

As described in the above patent document, users in conventional games who have performed multiplay together in the past would sometimes have a certain relationship. Users who have performed multiplay together could also form a friend relationship or a follower relationship, and a relationship independent of a session concerned would be established in such a case.

A purpose of the disclosure is to provide a new relationship between users who plays a game together.

Configuration 1

A non-transitory storage medium of Configuration 1 contains information processing instructions to be executed by a computer of a first terminal of a first user. When executed by the computer, the information processing instructions cause the computer to participate in a session and run a game via a network, and to perform operations of: updating game status based on an operation input from the first user; when positions of a first character controlled in a virtual space of the game by the first user and a second character controlled in the virtual space by a second user of a second terminal participating in the same session as the first terminal get closer than a predetermined criterion, establishing a predetermined relationship in the session between the first user and the second user; and during progress of the game, successively outputting information indicating game status of the second user updated based on an operation input from the second user whose predetermined relationship with the first user has been established.

As described above, the relationship established when the positions of the first character of the first user and the second character of the second user get closer than the predetermined criterion is a predetermined relationship in the session. This configuration allows a user to enjoy a moderate relationship with another user, since the first and second user can have the predetermined relationship and proceed the game in the session and the predetermined relationship does not continue after the session ends.

Configuration 2

When executed by the computer, the information processing instructions stored in the non-transitory storage medium of Configuration 1 may cause the computer to output positional information indicating a position in the virtual space of the second character of the second user whose predetermined relationship with the first user has been established, as the information indicating the game status of the second user.

Configuration 3

When executed by the computer, the information processing instructions stored in the non-transitory storage medium of Configuration 2 may cause the computer to transfer the first character with reference to the position of the second character of the second user whose predetermined relationship with the first user has been established, in response to a transfer operation done by the first user.

Configuration 4

When executed by the computer, the information processing instructions stored in the non-transitory storage medium of any of Configurations 1 to 3 may cause the computer to output operation input information corresponding to an operation input for an environmental object placed in the virtual space given by the second user whose predetermined relationship with the first user has been established, as the information indicating the game status of the second user.

Configuration 5

When executed by the computer, the information processing instructions stored in the non-transitory storage medium of Configuration 4 may cause the computer to add the operation input information of the second user output on the first terminal to a storage unit, and to output the operation input information stored in the storage unit as a candidate for operation input information that can be input, when accepting an operation input for an environmental object from the first user.

Configuration 6

When executed by the computer, the information processing instructions stored in the non-transitory storage medium of any of Configurations 1 to 5 may cause the computer to output information indicating the establishment of the predetermined relationship when establishing the predetermined relationship between the first user and the second user.

Configuration 7

The information processing instructions stored in the non-transitory storage medium of any of Configurations 1 to 6 may ensure that the predetermined relationship is not established between the user of the first terminal and the second user of the second terminal participating in the session when the first terminal joins the session.

Configuration 8

When executed by the computer, the information processing instructions stored in the non-transitory storage medium of any of Configurations 1 to 7 may cause the computer not to establish the predetermined relationship between the first user and the second user even when the distance between the first character and the second character gets shorter than the predetermined criterion if a restriction is set for the first terminal.

Configuration 9

The information processing instructions stored in the non-transitory storage medium of any of Configurations 1 to 8 may ensure that the session is discarded when a predetermined time has passed.

Configuration 10

An information processing apparatus of Configuration 10 is an information processing apparatus of a first terminal of a first user for performing a process to participate in a session and run a game via a network, and the information processing apparatus comprises: a unit for updating game status based on an operation input from the first user; a unit for, when positions of a first character controlled in a virtual space of the game by the first user and a second character controlled in the virtual space by a second user of a second terminal participating in the same session as the first terminal get closer than a predetermined criterion, establishing a predetermined relationship in the session between the first user and the second user; and a unit for, during progress of the game, successively outputting information indicating game status of the second user updated based on an operation input from the second user whose predetermined relationship with the first user has been established.

Configuration 11

An information processing method of Configuration 11 is for an information processing apparatus of a first terminal of a first user for performing a process to participate in a session and run a game via a network, and the information processing method comprises: updating game status based on an operation input from the first user; when positions of a first character controlled in a virtual space of the game by the first user and a second character controlled in the virtual space by a second user of a second terminal participating in the same session as the first terminal get closer than a predetermined criterion, establishing a predetermined relationship in the session between the first user and the second user; and during progress of the game, successively outputting information indicating game status of the second user updated based on an operation input from the second user whose predetermined relationship with the first user has been established.

Configuration 12

In the information processing method of Configuration 11, the information processing apparatus may output positional information indicating a position in the virtual space of the second character of the second user whose predetermined relationship with the first user has been established, as the information indicating the game status of the second user.

Configuration 13

In the information processing method of Configuration 12, the information processing apparatus may transfer the first character with reference to the position of the second character of the second user whose predetermined relationship with the first user has been established, in response to a transfer operation done by the first user.

Configuration 14

In the information processing method of any of Configurations 11 to 13, the information processing apparatus may output operation input information corresponding to an operation input for an environmental object placed in the virtual space given by the second user whose predetermined relationship with the first user has been established, as the information indicating the game status of the second user.

Configuration 15

In the information processing method of Configuration 14, the information processing apparatus may add the operation input information of the second user output on the first terminal to a storage unit, and may output the operation input information stored in the storage unit as a candidate for operation input information that can be input, when accepting an operation input for an environmental object from the first user.

Configuration 16

An information processing system of Configuration 16 comprises: a server apparatus for performing processing of a game based on an operation input from a user of a user terminal participating in a session; a first terminal of a first user participating in the session; and a second terminal of a second user participating in the same session as the first terminal, where the first terminal updates game status based on an operation input from the first user and sends information indicating the game status of the first user to the server apparatus, where the second terminal updates game status based on an operation input from the second user and sends information indicating the game status of the second user to the server apparatus, where the server apparatus establishes a predetermined relationship in the session between the first user and the second user when positions of a first character controlled in a virtual space of the game by the first user and a second character controlled in the virtual space by the second user get closer than a predetermined criterion, based on the information indicating the game status of the first user sent from the first terminal and on the information indicating the game status of the second user sent from the second terminal, where the first terminal, during progress of the game, successively outputs the information indicating the game status of the second user updated based on an operation input from the second user whose predetermined relationship with the first user has been established, and where the second terminal, during progress of the game, successively outputs the information indicating the game status of the first user updated based on an operation input from the first user whose predetermined relationship with the second user has been established.

Configuration 17

In the information processing system of Configuration 16, the first terminal may output positional information indicating a position in the virtual space of the second character of the second user whose predetermined relationship with the first user has been established, as the information indicating the game status of the second user.

Configuration 18

In the information processing system of Configuration 17, the first terminal may transfer the first character with reference to the position of the second character of the second user whose predetermined relationship with the first user has been established, in response to a transfer operation done by the first user.

Configuration 19

In the information processing system of any of Configurations 16 to 18, the first terminal may output operation input information corresponding to an operation input for an environmental object placed in the virtual space given by the second user whose predetermined relationship with the first user has been established, as the information indicating the game status of the second user.

Configuration 20

In the information processing system of Configuration 19, the first terminal may add the operation input information of the second user output on the first terminal to a storage unit, and may output the operation input information stored in the storage unit as a candidate for operation input information that can be input, when accepting an operation input for an environmental object from the first user.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 shows an example of session data of the first embodiment.

FIG. 13 shows an example of session data of the second embodiment.

FIG. 17 shows an example of sharer management data of the third embodiment.

MODES OF EMBODYING THE INVENTION

Information processing systems of the embodiments will now be described with reference to the drawings. The following description is merely illustrative of preferred modes, and is not intended to limit the invention described in the claims.

Figure 1:
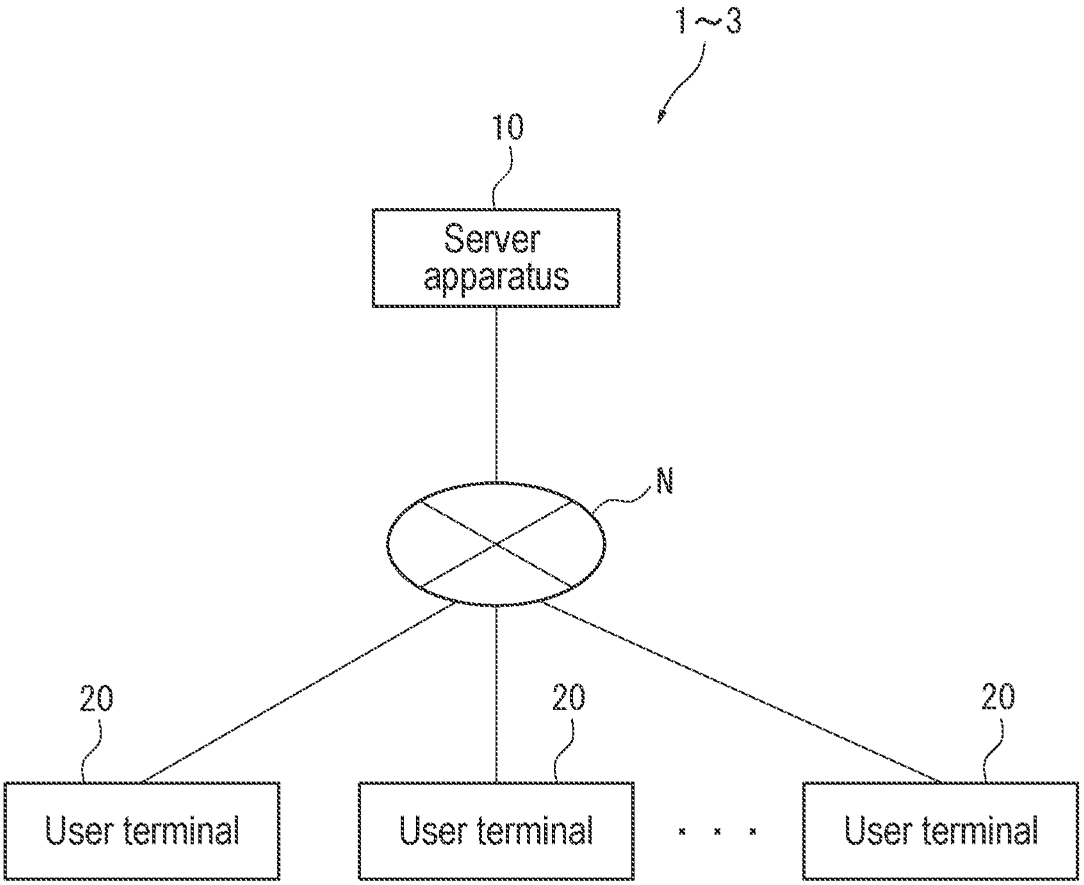
FIG. 1 is a schematic drawing showing a whole picture of an information processing system (a game system) of the embodiments.

FIG. 1 is a schematic drawing showing a whole picture of information processing systems (game systems) 1 to 3 of the embodiments. The information processing systems 1 to 3 of the embodiments each include a server apparatus 10 and a plurality of user terminals 20. The server apparatus 10 and the user terminals 20 are configured to be able to communicate with one another via a network N such as the Internet. Information processing is performed with such a configuration in the embodiments, and a game process will be described below as an example of the information processing. Specifically, an illustration will be given of a game process in which a game program is installed on each user terminal 20 and is executed while communicating with the server apparatus 10 as required.

Hardware Configuration of the Server

Figure 2:
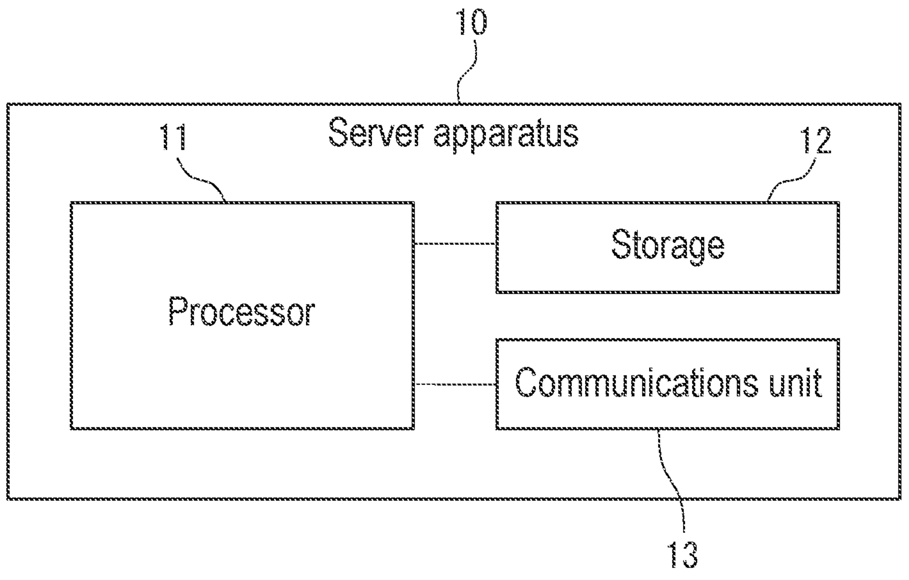
FIG. 2 is a block diagram showing a hardware configuration of a server apparatus.

FIG. 2 is a block diagram showing a hardware configuration of the server apparatus 10. The server apparatus 10 comprises at least a processor 11, a storage 12, and a communications unit 13. The processor 11 executes various programs for controlling the server apparatus 10. The storage 12 is stored with various programs to be executed by the processor 11 and various data to be used. The communications unit 13 connects to the network via wire or wireless communications, and sends and receives predetermined data to and from the above-described user terminals 20 or another server (not shown).

Hardware Configuration of Each User Terminal

The above-described user terminals 20 will be described next. Each user terminal 20 is, for example, a smartphone, a stationary or portable game apparatus, a tablet terminal, a portable phone, a personal computer, a wearable terminal, or the like. A stationary game apparatus is described in the embodiments as an example of the user terminals 20.

Figure 3:
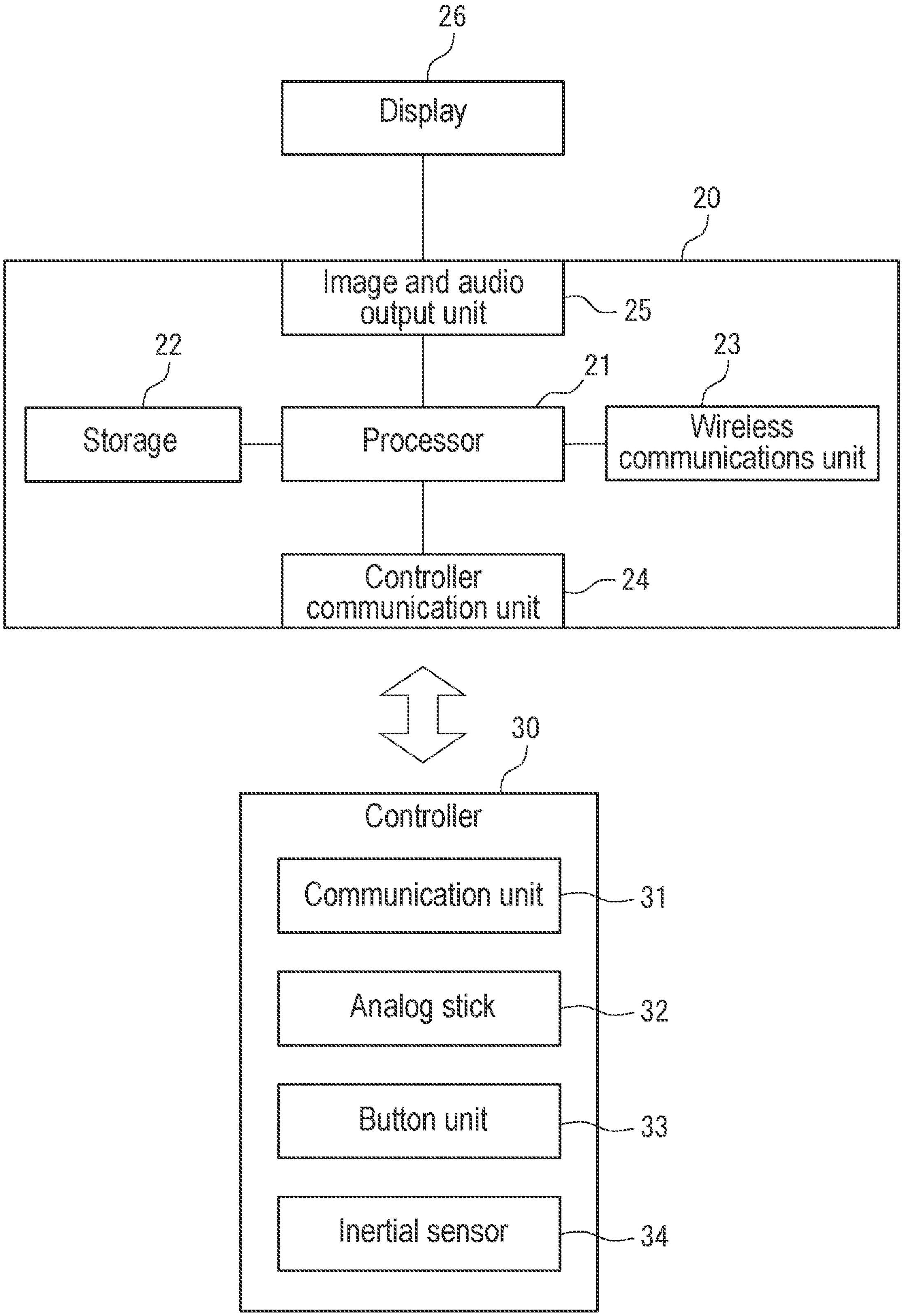
FIG. 3 is a block diagram showing an example of a hardware configuration of a user terminal.

FIG. 3 is a block diagram showing an example of a hardware configuration of each user terminal 20 of the embodiments. In FIG. 3, each user terminal 20 has a processor 21. The processor 21 is an information processing unit for performing various information processing performed on each user terminal 20, and may comprise, for example, a CPU (Central Processing Unit) only, or an SoC (System-on-a-Chip) including a plurality of functions such as a CPU function and a GPU (Graphics Processing Unit) function. The processor 21 executes an information processing program (e.g., a game program) stored in a storage 22 and thereby performs the various information processing. The storage 22 may be, for example, an internal storage medium such as a flash memory and a DRAM (Dynamic Random Access Memory), or configured to use an external storage medium inserted into a not-shown slot or the like.

Each user terminal 20 has a wireless communications unit 23 for wirelessly communicates with the server apparatus 10 and other user terminals 20. Internet communications and short-range wireless communications, for example, are used as the wireless communications.

Each user terminal 20 has a controller communication unit 24 for performing wire or wireless communication with a controller 30.

Each user terminal 20 is connected with a display 26 (e.g., a television) via an image and audio output unit 25. The processor 21 outputs generated images and audio (e.g., generated by the above-mentioned information processing being performed) via the image and audio output unit 25 to the display 26.

The controller 30 will be described next. Though not shown, the controller 30 of the embodiments has a vertically long housing, and can be gripped in a portrait orientation. The housing has a shape and size that can be gripped with one hand when gripped in a portrait orientation.

The controller 30 has at least one analog stick 32, which is an example of a direction input device. The analog stick 32 can be used as a direction input unit that can input directions. Through tilting the analog stick 32, a user can input a direction according to the direction of tilt (and the intensity according to the angle of tilt). The controller 30 also has a button unit 33 including various operation buttons. For example, the controller 30 may have a plurality of operation buttons on a main surface of the housing described above. The operation buttons include, for example, an ABXY button, a plus button, a minus button, an L button, and an R button.

The controller 30 also has an inertial sensor 34. Specifically, the controller 30 has an acceleration sensor and an angular rate sensor as the inertial sensor 34. In the embodiments, the acceleration sensor measures the acceleration along three predetermined axes. The angular rate sensor detects the angular rate around the three predetermined axes.

The controller 30 also has a communication unit 31 for performing wire or wireless communication with the controller communication unit 24 described above. A direction input to the above-described analog stick 32, information indicating how the buttons of the button unit 33 are pressed, and various detection results obtained by the inertial sensor 34 are output to the communication unit 31 and sent to the user terminal 20 in a timely manner and repeatedly.

Game Imagined in the Embodiments

Game processing performed in the embodiments will be described next. First, a game imagined in the embodiments will be summarized. The game imagined in the embodiments is a multiplay game in which a plurality of users explore the ocean together. Various living things, geographical features, scenery, and the like are arranged in the ocean as environmental objects, and the users can enjoy finding uncommon creatures, geographical features, and the like.

Multiplay is a plurality of users' playing one game at the same time via a communications network. The communications network may use Internet-based communications or short-range wireless communications. A user who is to participate in multiplay in the embodiments joins a session and performs multiplay on a session-by-session basis.

The following description is given of session management performed by the information processing systems in first and second embodiments, and of how information is shared among users participating in a session in a game in a third embodiment. Though the first and second embodiments and the third embodiment will be described separately for convenience of description, the information processing systems manage a session through session management described in the first and second embodiments and, in the session, realizes the users' information sharing described in the third embodiment.

First Embodiment

The first embodiment will be described with an example in which when a user of a user terminal 20 requests to join a session, the server apparatus 10 selects a session to be joined and causes the user to join the session. The number of users who can participate in one session (hereinafter referred to as the "participation capacity") is determined in advance, and if there is no open slot in any session's participation capacity, the server apparatus 10 generates a new session and causes the user to join the session. Note that a sentence "there is an open slot in the participation capacity" means a state in which the number of participant users has not reached the number of people specified by the participation capacity. Conversely, a sentence "there is no open slot in the participation capacity" means a state in which the number of participant users has reached the number of people specified by the participation capacity and no user is allowed to newly participate in the participation capacity.

Figure 4:
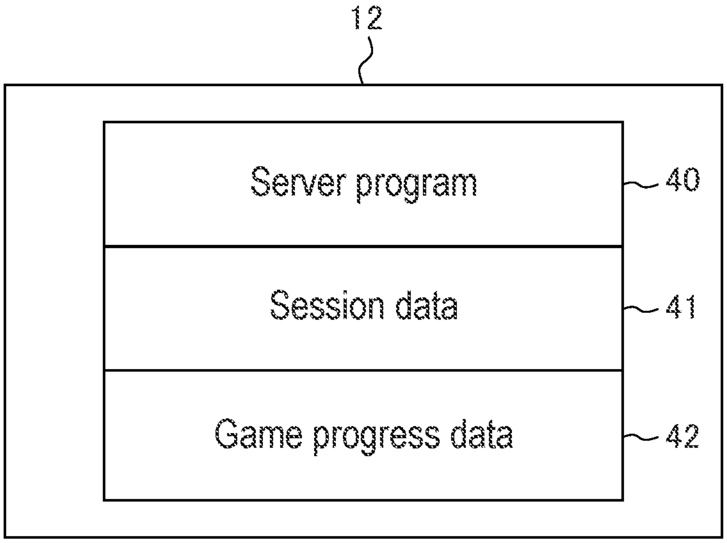
FIG. 4 is a memory map showing an example of various data stored in a storage of the server apparatus.

FIG. 4 is a memory map showing an example of various data stored in the storage 12 of the server apparatus 10. The storage 12 of the server apparatus 10 has a server program 40, session data 41, and game progress data 42. The server apparatus 10 reads the server program 40 stored in the storage 12 and executes it with the processor 11, thereby realizing the functions of the server apparatus 10. While the embodiment is described mainly about session management, the storage 12 of the server apparatus 10 may have data other than those described in FIG. 4.

Figure 5:
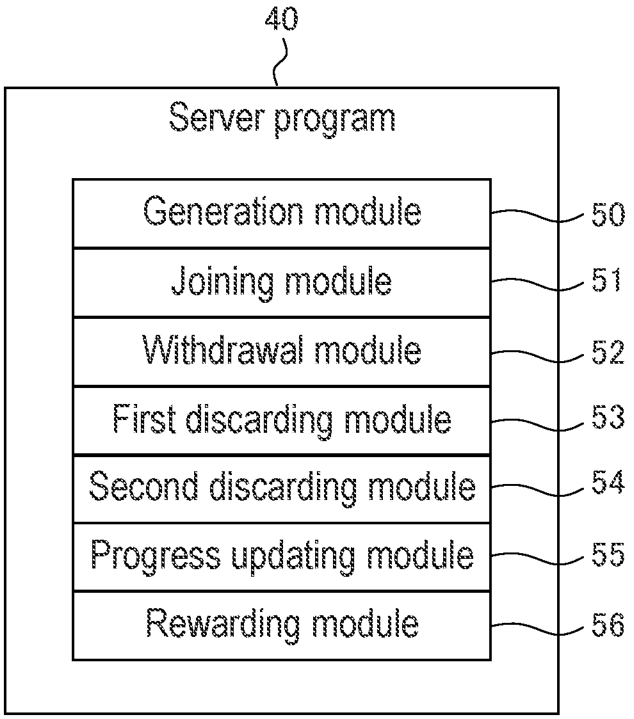
FIG. 5 shows the content of a server program of a first embodiment.

FIG. 5 shows the content of the server program 40. The server program 40 has a generation module 50, a joining module 51, a withdrawal module 52, a first discarding module 53, a second discarding module 54, a progress updating module 55, and a rewarding module 56.

The generation module 50 realizes a function to, upon receiving a session joining request from a user terminal 20, determine whether a session generation condition is satisfied or not and generate a new session if the session generation condition is satisfied. The session generation condition is that there is no session being managed by the server apparatus 10, or that there is a session being managed by the server apparatus 10 but no session has an open slot in its participation capacity. Conversely, if there is a session in which a user can participate, the server apparatus 10 does not generate a new session since the session generation condition is not satisfied. Through determining whether to generate a session or not based on this session generation condition, the information processing system 1 of the embodiment prevents the generation of too many sessions.

The joining module 51 has a function to, upon acquiring a joining request from a user terminal 20 of a user, cause the user to join a session selected based on a predetermined condition. Specifically, the joining module 51 establishes communications between the server apparatus 10 and the user terminal 20, and thereby causes the user of the user terminal 20 to join the session. The "predetermined condition" here may be any condition as long as it is for selecting a session. For example, a session may be selected by means of a certain calculation formula using random numbers or, for example, a session with many open slots may be selected as a priority based on the number of open slots in the participation capacity.

The joining module 51 also causes a user to join a session if a joining request is acquired again from a user terminal 20 of the user after the user left the session and if the session that the user left is not yet discarded and there is an open slot in the session's participation capacity. That is, the joining module 51 returns the user to the session in which the user was participating before the withdrawal.

The withdrawal module 52 has a function to withdraw a user participating in a session from the session when a withdrawal condition concerning the user is satisfied. The withdrawal condition is that a signal indicating quitting the game or a signal indicating withdrawing from a session is received from a user terminal 20, or that communications with a user terminal 20 are disconnected. A user in the game imagined in the embodiment can leave a session through the user's own operation. Even if one user left a session, the session itself would continue. If another participant user remains in a session, the game of the session continues with the other user, and even if a session becomes empty of users, the session continues for a certain period of time as described later.

The first discarding module 53 has a function to discard a session when a first time has passed since the session was generated. Discarding a session is for the server apparatus 10 to stop holding a session. Specifically, the server apparatus 10 deletes data of the relevant Session ID from the session data 41 described later. The server apparatus 10 discards a session when the first time has passed since the generation of the session, regardless of whether there is any participant user in the session or not. That is, the game of the session ends. The first time is the maximum endurance of a session, can be set appropriately according to the game, and is, for example, 120 minutes.

The second discarding module 54 has a function to monitor the number of users participating in a session and discard the session when a second time has passed since the number of users became zero. The second discarding module 54 then discards the session regardless of whether the first time has passed since the session was generated or not. This configuration causes a session to be discarded if a state where the session is empty of participants continues even before the first time has passed, and therefore an inactive session does not have to be managed. The second time is shorter than the first time, can be set appropriately, and is, for example, ten minutes.

The progress updating module 55 has a function to update the progress of a game connected to a session based on data acquired from user terminals 20 of users participating in the session. The progress is, for example, the degree of achievement of a mission set for a game connected to a session. The progress updating module 55 may be provided on each user terminal 20.

The rewarding module 56 has a function to give a reward to users participating in a session when the progress of a game connected to the session satisfies a rewarding condition. The rewarding module 56 shall give the reward to users who were participating in the session at a time when the progress satisfied the rewarding condition. The rewarding module 56 does not reward, for example, users who were already withdrawn from the session at the time and users who joined the session after the time. The rewarding module 56 may be provided on each user terminal 20.

FIG. 6 shows an example of the session data 41. The session data 41 is data related to a session currently being managed by the server apparatus 10. The session data 41 includes Session ID, Elapsed time T1, Elapsed time T2, Participant user, and Number of open slots. Session ID is information for specifying a session. Elapsed time T1 is time elapsed from the generation of a session. Elapsed time T2 is time elapsed from when a session became empty of participant users.

Participant user is a user ID of a user participating in a session. Number of open slots is information indicating how many more people can join a session. That is to say, Number of open slots=participation capacity−number of Participant users. The participation capacity of a session in the embodiment is 100, and if there is no participant like a session of Session ID S0002, Number of open slots is 100. If the number of users who can participate differs from session to session, data on a session's participation capacity may be included in the session data 41.

As for the session whose Session ID is S0001 in the example shown in FIG. 6, 75 minutes have passed since the start of the session and U1234, U2332, and the like are participating as participant users. As for the session whose Session ID is S0002, 50 minutes have passed since the start of the session (Elapsed time T1). This session is currently empty of participant users, and the state in which there is no participant user has continued for five minutes (Elapsed time T2). If a user joins the session whose Session ID is S0002, Elapsed time T2 is reset.

Figure 7:
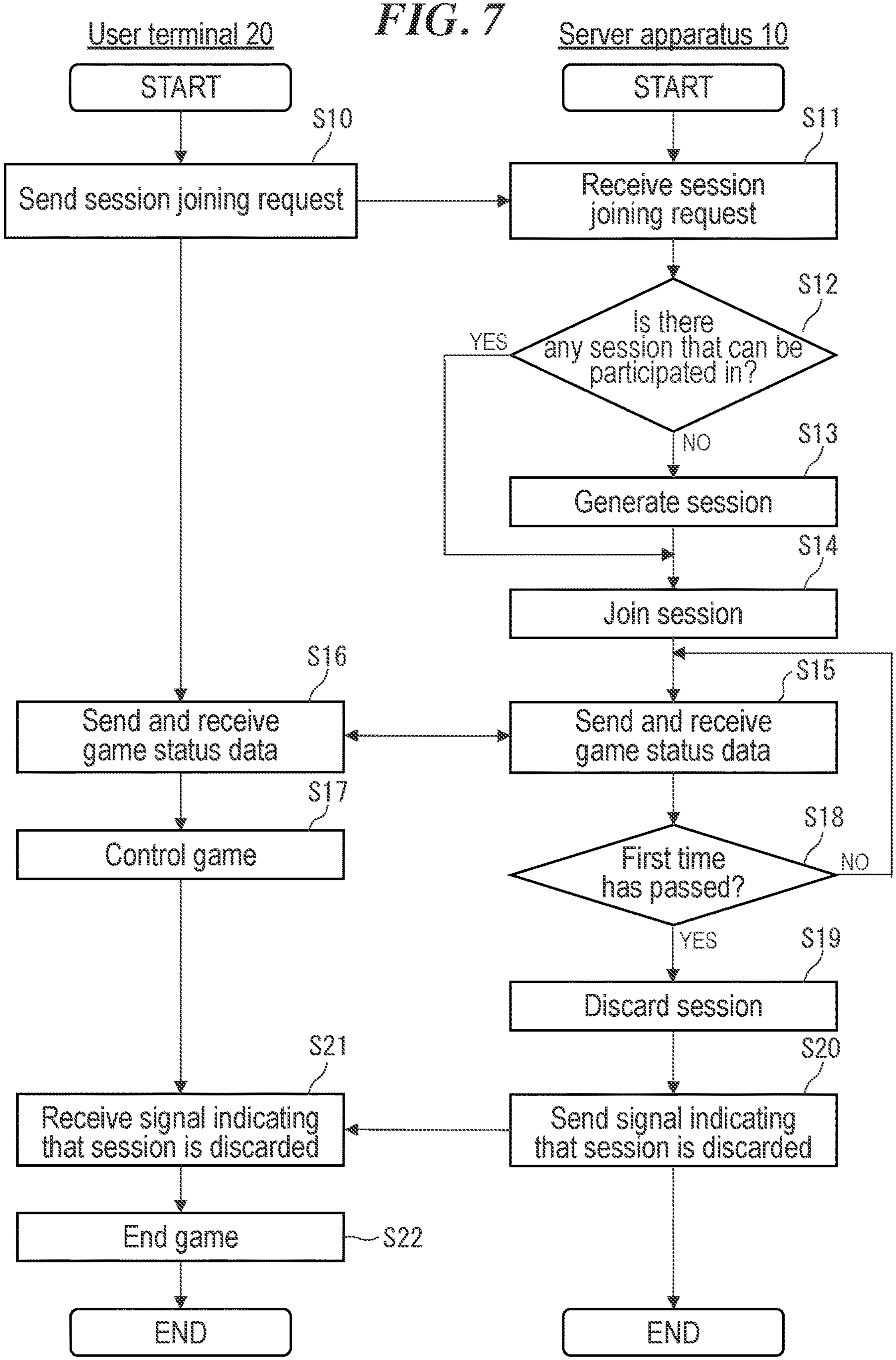
FIG. 7 shows an operation of the information processing system from generation to discarding of a session.

FIG. 7 shows an operation of the information processing system 1. FIG. 7 shows the operation from generation to discarding of a session. When a user uses a user terminal 20 to operate to join a session, the user terminal 20 sends a session joining request to the server apparatus 10 (S10). Upon receiving the session joining request sent from the user terminal 20 (S11), the server apparatus 10 determines whether there is a session in which the user can participate or not with reference to the session data 41 (S12). The server apparatus 10 determines that there is no session in which the user can participate if there is no session being managed by the server apparatus 10 or if there is a session but every session's Number of open slots that can be participated in is zero.

If there is no session in which the user can participate (NO at S12), the server apparatus 10 generates a new session (S13). After generating the new session, the server apparatus 10 adds Session ID of the generated session to the session data 41 (see FIG. 6). If there is a session in which the user can participate (YES at S12), or after generating a session (S13), the server apparatus 10 causes the user who sent the session joining request to join the session with an open slot (S14).

The server apparatus 10 establishes communications with the user terminal 20 of the user who joined the session, and sends and receives game status data (S15 and S16). An example of the sent and received game status data will be described here.

There is a virtual space to explore for each session in the embodiment, and game status data includes data on geographical features constituting the virtual space, a map of the virtual space, and data on environmental objects such as living things existing in the virtual space. Remaining time of a session and data on explored regions are also game status data. The server apparatus 10 sends such game status data to user terminals 20 participating in a session.

Game status data sent from each user terminal 20 to the server apparatus 10 includes data on the position of the user's character determined by an operation input accepted by each user terminal 20 and data on environmental objects found by the user. In this way, the server apparatus 10 exchanges game status data with user terminals 20 participating in a session, thereby synchronizes game statuses of a plurality of user terminals 20, and realizes multiplay.

The user terminal 20 performs game control such as displaying a game screen based on the received game status data, and updating a game screen upon accepting an operation input from the user (S17).

The server apparatus 10 compares Elapsed time T1, which is time elapsed since the start of the session, with the first time on a session-by-session basis, and determines whether the first time has passed or not (S18). If it is determined that the first time has not passed (NO at S18), the server apparatus 10 returns to the process of sending and receiving game status data (S15). That is, the server apparatus 10 determines whether the first time has passed or not while synchronizing game statuses of the user terminals 20 participating in the session and realizing multiplay.

If it is determined that the first time has passed (YES at S18), the server apparatus 10 discards the session for which the first time has passed (S19). The server apparatus 10 deletes Session ID of the discarded session from the session data 41 (see FIG. 6). The server apparatus 10 sends a signal indicating that the session is discarded to the user terminal 20 (S20). Upon receiving the signal indicating the discarding of the session (S21), the user terminal 20 ends the game of the session (S22).

Figure 8:
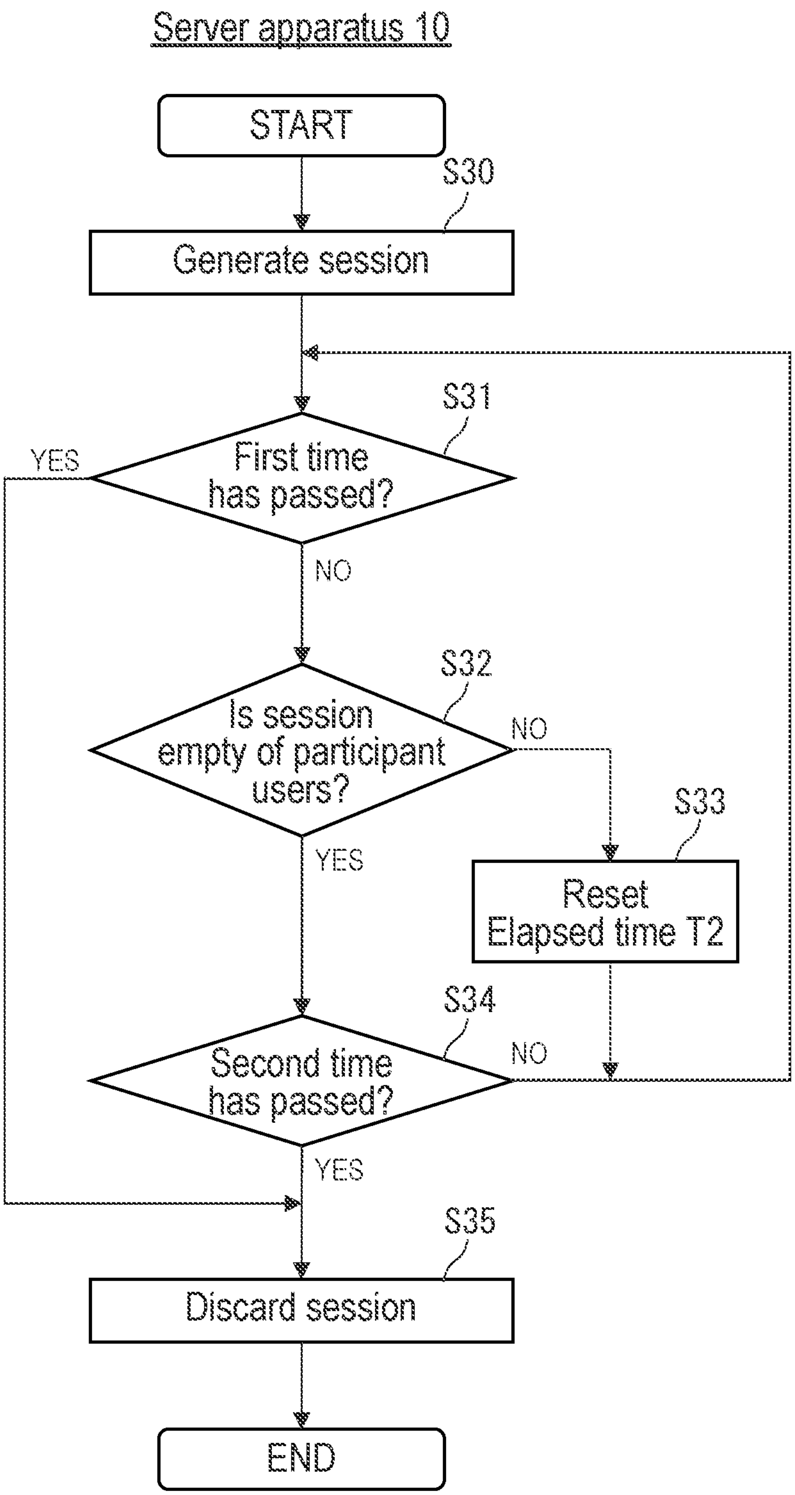
FIG. 8 shows an operation of the information processing system performed when a session becomes empty of participants during the session.

FIG. 8 shows an operation of the server apparatus 10 performed when a session becomes empty of participants during the session. The general operation of the information processing system 1 is shown in the flow shown in FIG. 7, and FIG. 8 shows only part related to session management. After generating a session (S30), the server apparatus 10 measures Elapsed time T1 that has elapsed since the generation of the session, and determines whether the first time has passed or not (S31). If the first time has passed (YES at S31), the server apparatus 10 discards the session (S34).

If it is determined that the first time has not passed (NO at S31), the server apparatus 10 determines whether the session is empty of participant users or not (S32). If it is determined that the session is not empty of participant users (NO at S32), the server apparatus 10 returns to the process of determining whether the first time has passed or not (S31). If measurement of Elapsed time T2 for measuring the second time has started then, the server apparatus 10 resets the timer for Elapsed time T2 (S33).

If it is determined that the session is empty of participant users (YES at S32), the server apparatus 10 measures Elapsed time T2 that has elapsed since the session became empty of participant users, and determines whether the second time has passed or not (S34). If it is determined that the second time has passed (YES at S34), the server apparatus 10 discards the session (S35). If it is determined that the second time has not passed (NO at S34), the server apparatus 10 returns to the process of determining whether the first time has passed or not (S31).

Figure 9:
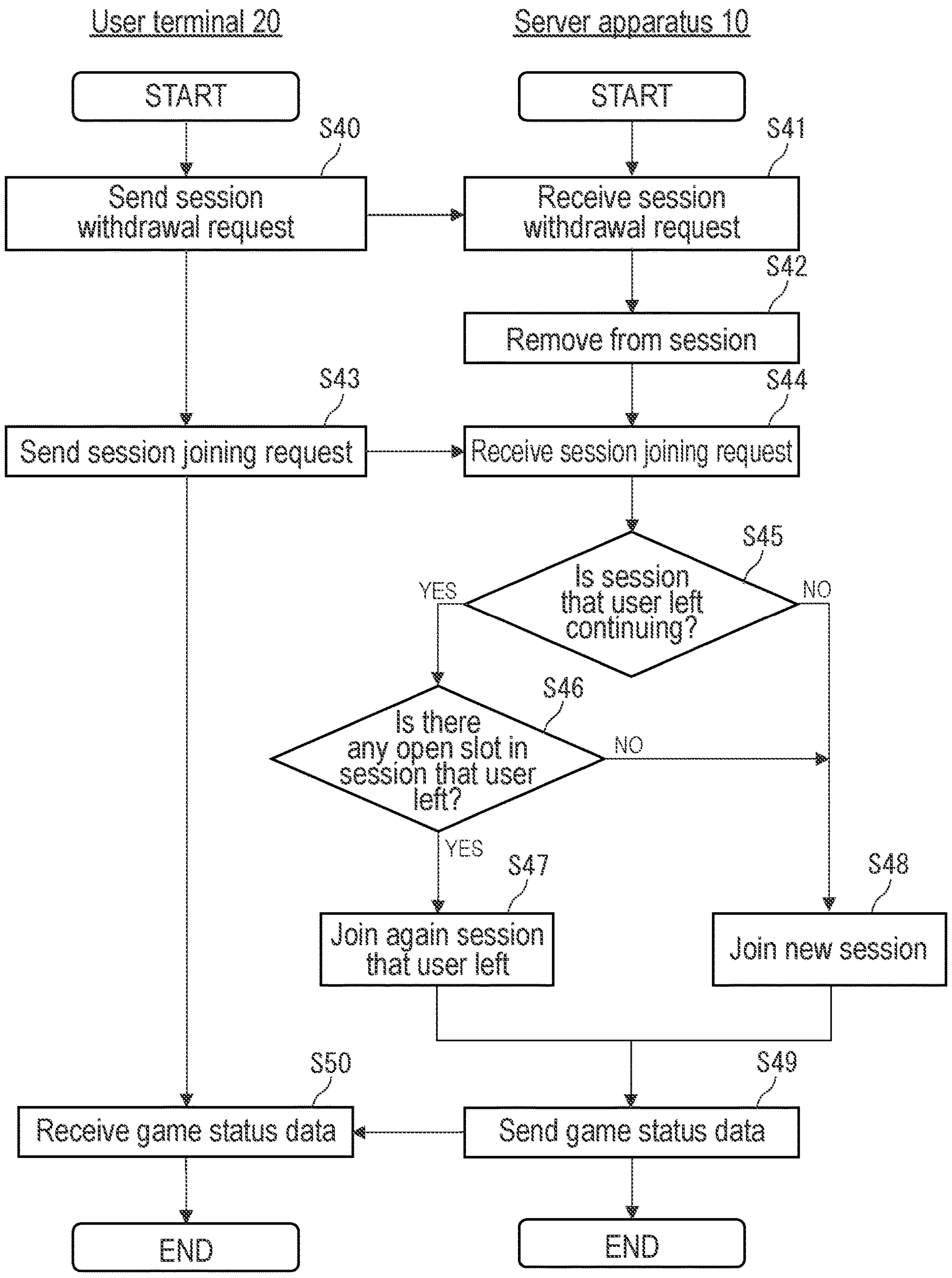
FIG. 9 shows an operation of the information processing system performed when a user who left a session requests to join again.

FIG. 9 shows an operation of the information processing system 1 performed when a user who left a session requests to join again. The flow shown in FIG. 9 starts in a state where a user terminal 20 participates in a session.

When a user participating in a session operates to leave the session, the user's user terminal 20 sends a session withdrawal request to the server apparatus 10 (S40). Upon receiving the session withdrawal request (S41), the server apparatus 10 removes the user terminal 20 that sent the session withdrawal request from the session (S42). The server apparatus 10 deletes the user's user ID from the session data 41 (see FIG. 6). While a case where a user leaves a session through the user's operation to leave the session is cited here as an example, the operation described below is the same also for a case where a user of a user terminal 20 leaves a session due to a break in communications between the user terminal 20 and the server apparatus 10.

When the user uses the user terminal 20 to operate to join a session, the user terminal 20 sends a session joining request to the server apparatus 10 (S43). Upon receiving the session joining request sent from the user terminal 20 (S44), the server apparatus 10 determines whether the session that the user who sent the session joining request left has not been discarded and is continuing or not (S45).

There may be some methods for the determination, such as the following. In one method, the user terminal 20 sends Session ID of the session that the user left when the user terminal 20 sends the session joining request, and the server apparatus 10 determines whether the session of the Session ID is continuing or not. In another method, the server apparatus 10 manages the history of Session ID of the session in which the user of the user terminal 20 participated in association with the user terminal 20, and determines whether the session is continuing or not. While the two methods are cited as examples here, the method of determining whether the session that the user left is continuing or not is not limited to those mentioned here.

If the session that the user left is continuing (YES at S45), the server apparatus 10 determines whether there is an open slot in the participation capacity of the session that the user left or not (S46) and, if there is an open slot (YES at S46), causes the user of the user terminal 20 that sent the session joining request to join again the session that the user left (S47).

If the session that the user left is not continuing (NO at S45) or if the session that the user left is continuing but there is no open slot in the session's participation capacity (NO at S46), the server apparatus 10 causes the user of the user terminal 20 that sent the session joining request to join a new session (S48). The server apparatus 10 generates a new session if there is no session that can be participated in, and this operation is the same as that described with FIG. 7 (S12 to S13 in FIG. 7).

The above is a description of the information processing system 1 and the session management method of the first embodiment. The information processing system 1 of the first embodiment discards a session when the first time has passed since the generation of the session and additionally discards a session when the session becomes empty of participant users even before the first time has passed, and therefore unused sessions can be discarded to reduce the cost of session management. The configuration of the embodiment is effective for games of the type that allows users to come in and out of a session like the game imagined in the embodiment since their session is assumed to become empty of participant users due to users voluntarily leaving the session.

When receiving a session joining request from a user who withdrew from a session, the information processing system 1 of the embodiment returns the user to the session in which the user participated before the withdrawal, and therefore it can restrain the generation of new sessions and reduce the cost of session management.

The information processing system 1 of the embodiment may be provided with an option that allows a user who withdrew from a session to participate in a session other than the session in which the user participated before the withdrawal. A session which a user participated in before the user's withdrawal and which is continuing is referred to as a "session-participated-in."

Figure 10:
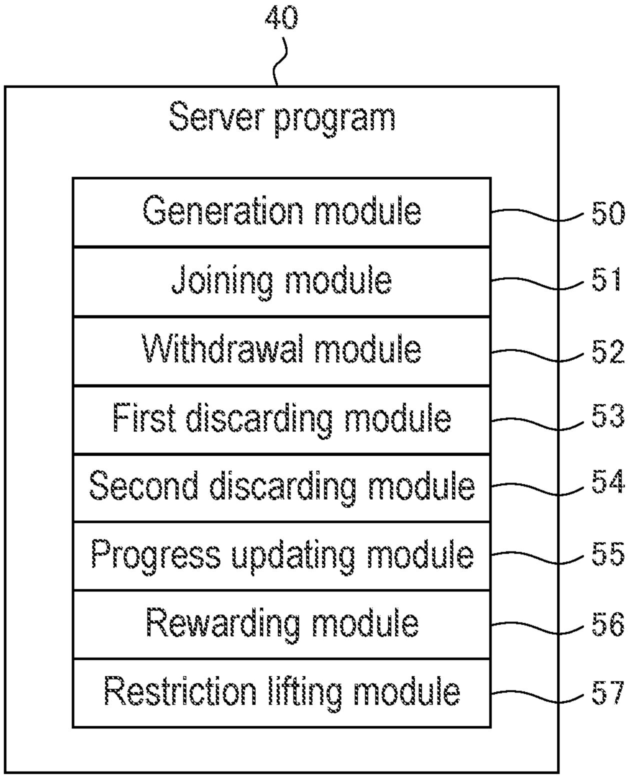
FIG. 10 shows the content of the server program of a variation of the first embodiment.

FIG. 10 shows the content of the server program of a variation of the first embodiment. The server program of the variation has a restriction lifting module 57 in addition to the constituent elements of the server program shown in FIG. 5.

In the variation, the joining module 51 receives, in addition to the joining request described in the above embodiment, a joining request for a session other than a session-participated-in. This joining request is an option useful for a case where, for example, a user thinks that the user has explored a session-participated-in to some degree and therefore wants to enter a new session without waiting for the session-participated-in to be discarded. If a button for a joining request for a new session is displayed on each user terminal 20 in addition to a button for a joining request, a user can choose which mode to make a joining request in. The joining module 51, however, basically restricts the participation in another session in order to prevent the generation of too many sessions.

The restriction lifting module 57 has a function to lift the restriction on the participation in another session. The restriction lifting module 57 has a function to lift the restriction on the participation in another session in exchange for performing subtraction on a predetermined parameter managed in association with the user. The restriction lifting module 57 does not lift the restriction when the predetermined parameter is small in value and the subtraction cannot be performed. The predetermined parameter is, for example, coin that a user saved in sessions that the user previously participated in. The time when the subtraction cannot be performed is when the subtraction processing would cause the parameter to become negative.

Figure 11:
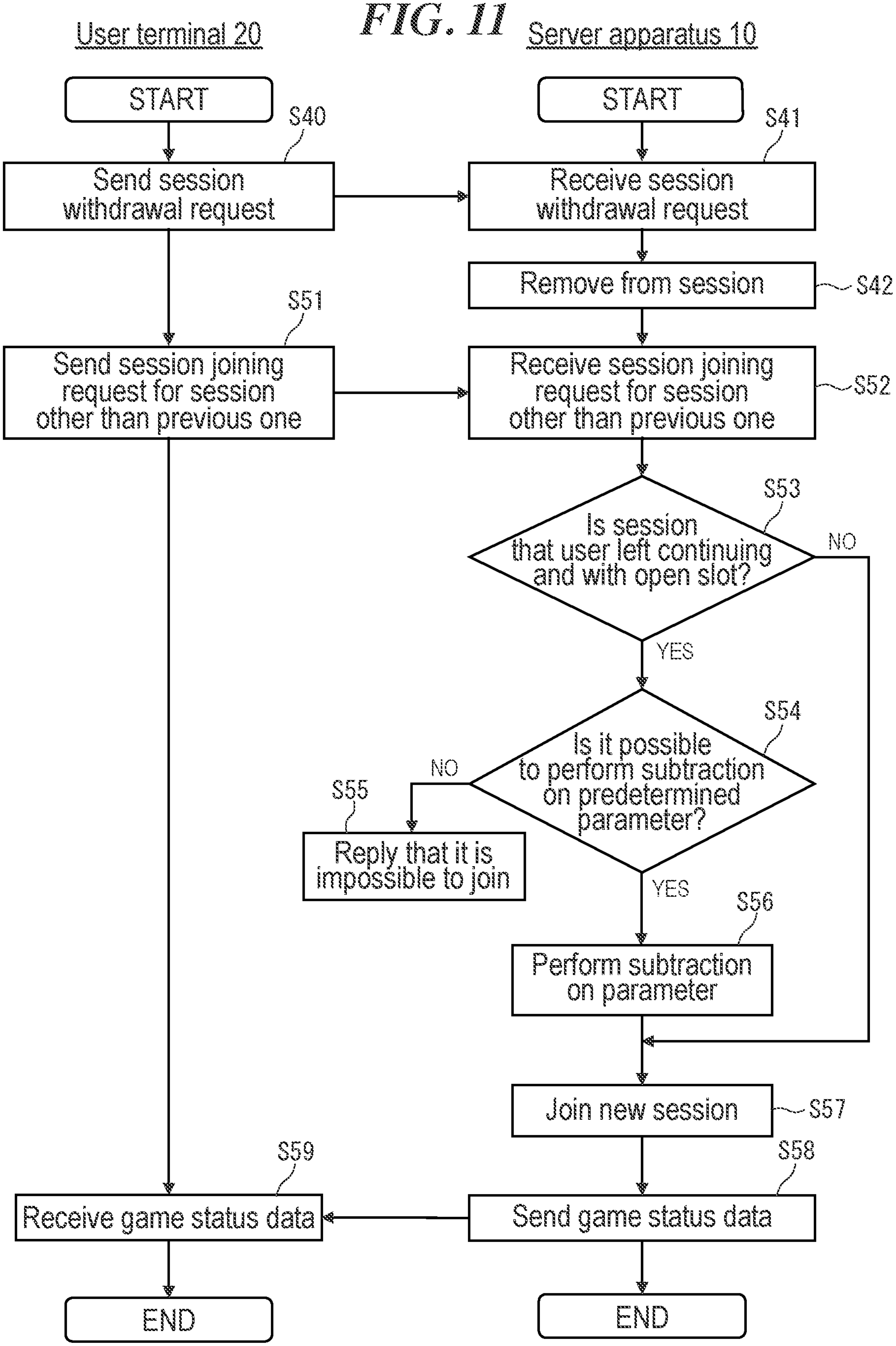
FIG. 11 shows an operation of the information processing system performed when a joining request is made for a session other than the previous one.

FIG. 11 shows an operation of the information processing system performed when a joining request is made for a session other than the previous one. The flow shown in FIG. 11 starts in a state where a user terminal 20 participates in a session.

When a user participating in a session operates to leave the session, the user's user terminal 20 sends a session withdrawal request to the server apparatus 10 (S40). Upon receiving the session withdrawal request (S41), the server apparatus 10 removes the user terminal 20 that sent the session withdrawal request from the session (S42). The server apparatus 10 deletes the user's user ID from the session data 41 (see FIG. 6). While a case where a user leaves a session through the user's operation to leave the session is cited here as an example, the operation described below is the same also for a case where a user of a user terminal 20 leaves a session due to a break in communications between the user terminal 20 and the server apparatus 10.

When the user uses the user terminal 20 to operate to join a session other than the session that the user left, the user terminal 20 sends a session joining request for a session other than the previous session to the server apparatus 10 (S51). Upon receiving the session joining request sent from the user terminal 20 (S52), the server apparatus 10 determines whether the session that the user who sent the session joining request left has not been discarded, is continuing, and has an open slot or not (S53).

If the session that the user left is not continuing or if the session that the user left has no open slot (NO at S53), the server apparatus 10 causes the user of the user terminal 20 that sent the session joining request to join a new session (S57). This operation is the same as that described in the first embodiment (S45, S46, and S48 in FIG. 9).

If the session that the user left is continuing and has an open slot (YES at S53), the server apparatus 10 determines whether it is possible to perform the subtraction on the predetermined parameter associated with the user of the user terminal 20 that sent the joining request or not (S54). If the subtraction cannot be performed on the predetermined parameter (NO at S54), the server apparatus 10 sends a reply to the user terminal 20 that it is impossible to join another session (S55).

If the subtraction can be performed on the parameter (YES at S54), the server apparatus 10 performs the subtraction on the parameter associated with the user (S56), and causes the user to join a new session (S57). The server apparatus 10 generates a new session if there is no session that can be participated in, and this operation is the same as that described with FIG. 7 (S12 to S13 in FIG. 7).

The above configuration allows the user to have an option to move to a new session early. On the other hand, the requirement to perform the subtraction on the predetermined parameter allows for restraining participation in a new session to a certain degree and preventing the generation of too many sessions.

Second Embodiment

The information processing system 2 of the second embodiment will be described next. While in the information processing system 1 of the first embodiment a session has one kind of participation capacity, an example in which a session has two kinds of participation capacities will be described in the second embodiment. The two participation capacities handled by the information processing system 2 of the second embodiment are referred to as "the first participation capacity" and "the second participation capacity." The first participation capacity is for unspecified users to participate in. The second participation capacity is for users who made joining requests for the session to participate in. For example, if a session's whole participation capacity is 100 people, the first participation capacity can be 10 people and the second participation capacity can be 90 people.

The hardware configuration of the information processing system 2 of the second embodiment is the same as the first embodiment (see FIGS. 1 to 3). The information processing system 2 of the second embodiment is different in the server program 40 and the session data 41 stored in the storage 12 of the server apparatus 10.

Figure 12:
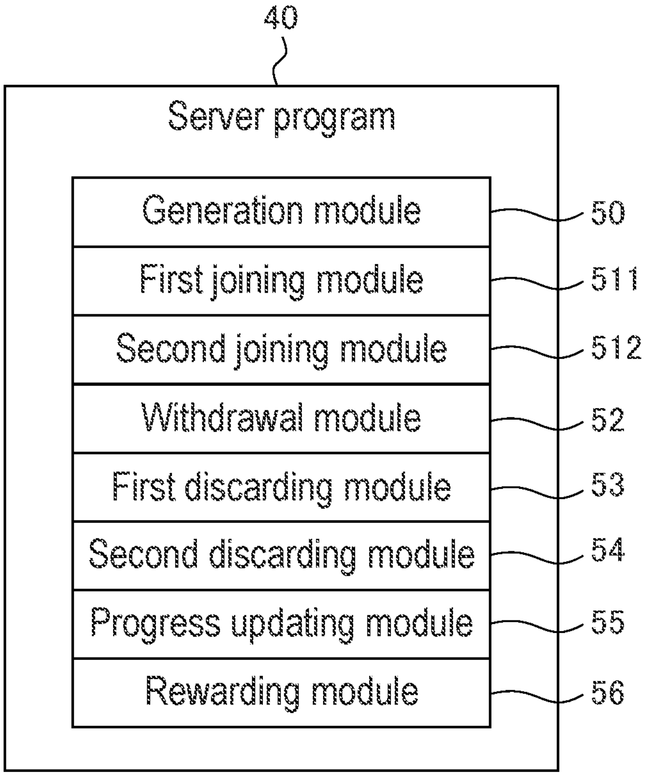
FIG. 12 shows the content of the server program of a second embodiment.

FIG. 12 shows the content of the server program 40 of the second embodiment. The server program 40 has the generation module 50, a first joining module 511, a second joining module 512, the withdrawal module 52, the first discarding module 53, the second discarding module 54, the progress updating module 55, and the rewarding module 56. Of the modules of the server program 40 of the second embodiment, the configurations of the generation module 50, the withdrawal module 52, the first discarding module 53, the second discarding module 54, the progress updating module 55, and the rewarding module 56 are the same as the information processing system 1 of the first embodiment. Configurations different from the first embodiment will be mainly described below.

The first joining module 511 has a function to cause a user of a user terminal 20 to join a session when a first joining request is acquired from the user terminal 20. A "first joining request" just mentioned is a joining request for a session made by a user without specifying any desired session to join. The first joining module 511 has a function to, upon receiving the first joining request, select a session for the user to join based on a predetermined condition, and cause the user to join the session whose first participation capacity has an open slot after assigning the user to the first participation capacity. From a user point of view, the first joining request is a method for a user to join a session allocated by the server apparatus 10.

The second joining module 512 has a function to cause a user to join a session when a second joining request is acquired from a user terminal 20 of the user. A "second joining request" just mentioned is a joining request for a session made by a user specifying a specific session. For example, a second joining request is made when a user is invited by a friend to join a session or when an influential person (influencer) goes public with Session ID of a session being played by the person and a user joins the session.

When a second joining request for a specific session is acquired from the user terminal 20 and if the specific session's second participation capacity has an open slot, the second joining module 512 causes the user to join the specific session after assigning the user to the specific session's second participation capacity. If there is no open slot in the second participation capacity of the specific session specified by the second joining request, the second joining module 512 notifies the user terminal 20 that it is impossible to join the session.

FIG. 13 shows an example of the session data 41 of the second embodiment. The session data 41 is data related to a session currently being managed by the server apparatus 10. The session data 41 includes Session ID, Elapsed time T1, Elapsed time T2, Participation capacity, Participant user, and Number of open slots. Session ID, Elapsed time T1, and Elapsed time T2 are the same as the information processing system 1 of the first embodiment. Participant user and Number of open slots are stored for each of First and Second participation capacities in the second embodiment.

As for the session whose Session ID is S0001 in the example shown in FIG. 13, 75 minutes have passed since the start of the session (Elapsed time T1); U1234, U2332, and the like are stored as Participant users assigned to First participation capacity; and U5237 and U3672 are stored as Participant users assigned to Second participation capacity. Note that though user IDs of participant users are assigned to the first and second participation capacities in the session data 41, the game does not progress differently between user terminals 20 that joined through the first participation capacity and user terminals 20 that joined through the second participation capacity.

As for the session whose Session ID is S0002, 50 minutes have passed since the start of the session (Elapsed time T1). This session is currently empty of participant users, and the state in which there is no participant user has continued for five minutes (Elapsed time T2). If a user joins the session whose Session ID is S0002, Elapsed time T2 is reset.

Figure 14:
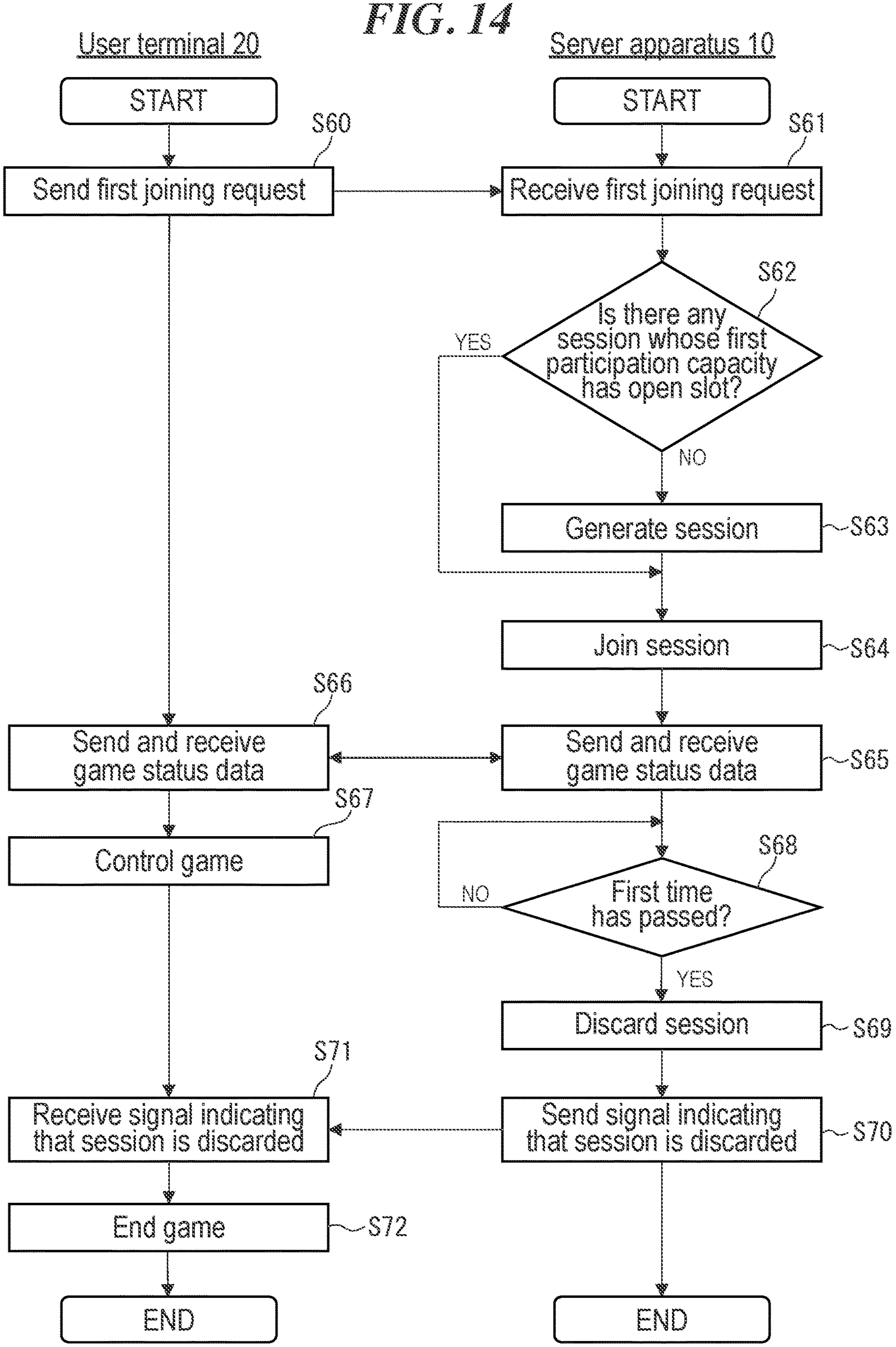
FIG. 14 shows an operation of the information processing system related to a first joining request.

FIG. 14 shows an operation of the information processing system 2 regarding a first joining request. When a user uses a user terminal 20 to operate to join a session without specifying a session, the user terminal 20 sends a first joining request to the server apparatus 10 (S60). Upon receiving the first joining request sent from the user terminal 20 (S61), the server apparatus 10 determines whether there is a session whose first participation capacity has an open slot or not with reference to the session data 41 (S62). It is determined that there is no session in which the user can participate if the server apparatus 10 is not managing any session or if there is a session but every session's Number of open slots in the first participation capacity is zero.

If there is no session whose first participation capacity has an open slot (NO at S62), the server apparatus 10 generates a new session (S63). If there is a session whose first participation capacity has an open slot (YES at S62), or after generating a session (S63), the server apparatus 10 causes the user who sent the first joining request to join the session with an open slot (S64).

The server apparatus 10 establishes communications with the user terminal 20 of the user who joined the session. The server apparatus 10 and the user terminal 20 send and receive game status data to and from each other (S65 and S66). The user terminal 20 performs game control such as displaying a game screen based on the received game status data, and updating a game screen upon accepting an operation input from the user (S67).

The server apparatus 10 compares Elapsed time T1, which is time elapsed since the start of the session, with the first time on a session-by-session basis, and determines whether the first time has passed or not (S68). If it is determined that the first time has passed (YES at S68), the server apparatus 10 discards the session for which the first time has passed (S69). The server apparatus 10 deletes Session ID of the discarded session from the session data 41 (see FIG. 13). The server apparatus 10 sends a signal indicating that the session is discarded to the user terminal 20 (S70), and the user terminal 20, upon receiving the signal indicating the discarding of the session (S71), ends the game of the session (S72).

Figure 15:
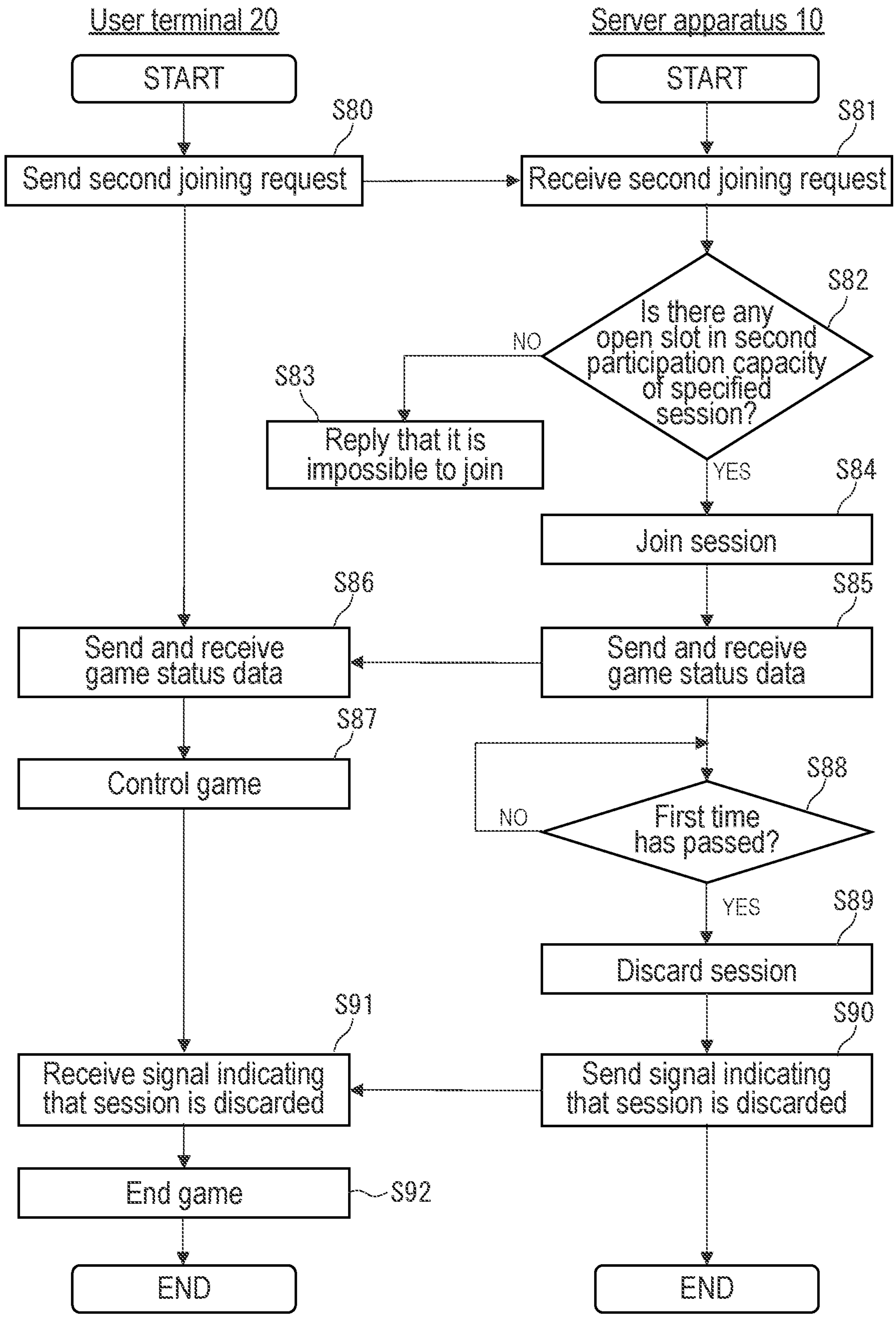
FIG. 15 shows an operation of the information processing system related to a second joining request.

FIG. 15 shows an operation of the information processing system 2 regarding a second joining request. When a user uses a user terminal 20 to operate to specify and join a session, the user terminal 20 sends a second joining request to the server apparatus 10 (S80). Upon receiving the second joining request sent from the user terminal 20 (S81), the server apparatus 10 determines whether there is an open slot in the second participation capacity of the session specified by Session ID or not (S82).

If it is determined that there is no open slot in the second participation capacity (NO at S82) in this determination, the server apparatus 10 notifies the user terminal 20 that sent the second joining request that it is impossible to join the specified session (S83). The operation for when there is an open slot in the specified session's second participation capacity (S84 to S92) is the same as that for when the server apparatus 10 received a first joining request (S64 to S72 in FIG. 14).

Third Embodiment

The information processing system 3 of the third embodiment will be described next. The configuration of the information processing system 3 of the third embodiment is basically the same as the information processing system 1 of the first embodiment (see FIGS. 1 to 3), but is characterized in the mechanism for users participating in a session to share information in a game. Users who share information are herein referred to as "sharers" for convenience sake.

Figure 16:
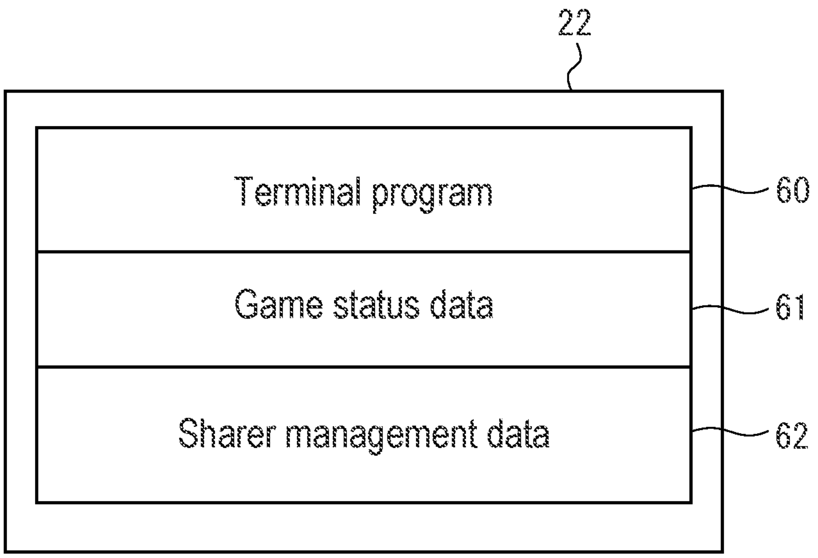
FIG. 16 is a memory map showing an example of various data stored in a storage of a user terminal used in a third embodiment.

FIG. 16 is a memory map showing an example of various data stored in the storage 22 of each user terminal 20 used in the third embodiment. The storage 22 of each user terminal 20 has a terminal program 60, game status data 61, and sharer management data 62. While the embodiment is described mainly about information sharing with a sharer, the storage 22 of each user terminal 20 may have data other than those described in FIG. 16. First, the game status data 61 and the sharer management data 62 will be described.

The game status data 61 includes data indicating the game status that is updated by operations of users participating in a session. Each user terminal 20 receives game status data updated by other users' operations from the server apparatus 10. Game statuses of the user terminals 20 of the users participating in a session are synchronized, which realizes multiplay. Examples of the game status data 61 include: geographical features and a map of a virtual space that the game takes place in; environmental objects existing in the virtual space; data on the positions and forms of characters controlled by other users; data on explored regions; and the progress of the game.

The game status data 61 also includes game status data specific to the user of each user terminal 20. Examples of those are data on places where the user went in the past, environmental objects found by the user, or the like. These data only have to be held by the user of each user terminal 20 and do not necessarily need to be output to other users' user terminals 20.

The sharer management data 62 specifies other participant users who are in sharer relationships. FIG. 17 shows an example of the sharer management data 62. The sharer management data 62 has User ID for identifying another user who is in a sharer relationship, Time when the sharer relationship was established, and data indicating whether the other user is online or not. The data indicating whether the other user is online or not is marked with a circle when the other user is online.

The sharer management data 62 is valid as long as a session continues, and is deleted when the session is discarded. Therefore, no User ID is stored in the sharer management data 62 at the beginning of participation in a session. When a sharer user returns to a session after withdrawing once from the session, the sharer relationship remains continuous. The user terminal 20 causes the data indicating whether the other user, the sharer, is online or not to be marked with a cross, which indicates that the other user is offline, while the other user is away from the session, and updates it to a circle when the other user returns to the session. As a variation, User ID of a user who left a session may be deleted from the sharer management data 62.

As described above, a sharer relationship is for a session only. The strength of the relationship is moderate in that the relation with a user who has been a sharer disappears after the session ends. A user can be moderately connected with another user while participating in a session. There is no sharer user at the beginning when a user joins a session, and the user meets other users' characters and connects with them as a sharer during the session, which allows the user to enjoy.

The sharer management data 62 is stored in each user terminal 20 in the embodiment. A sharer relationship is established if the distance to another user satisfies a predetermined criterion as described later, and no permission is required from the other user. Each user terminal 20 individually makes the determination and registers a sharer, while the criterion for determining whether a sharer relationship is to be established or not is common to the user terminals 20, and therefore when characters get closer than the predetermined criterion, user terminals 20 of both characters will register as a sharer. For example, when a user A determines a user B to be a sharer, the user B also determines the user A to be a sharer. Accordingly, sharers can share information.

There may occur a case where a user A registers a user B as a sharer but the user B does not register the user A as a sharer due to user terminals 20 and the server apparatus 10 being out of synchronization, but such a situation is allowed in the embodiment. There may be a variation in which when the distance between a character of a user A and a character of a user B satisfies the predetermined criterion on a terminal of the user A and the distance between the character of the user A and the character of the user B satisfies the predetermined criterion on a terminal of the user B, the user A registers the user B as a sharer and the user B registers the user A as a sharer.

Figure 18:
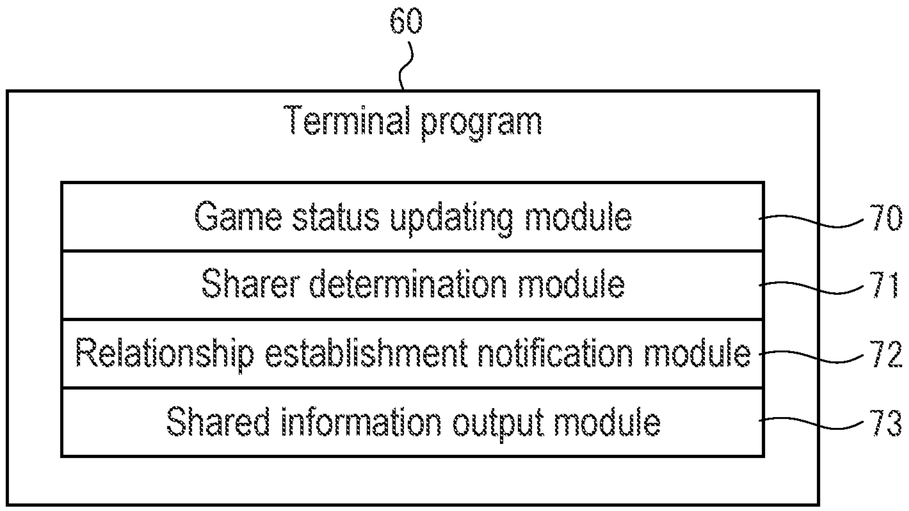
FIG. 18 shows a configuration of a terminal program of the third embodiment.

The terminal program 60 will be described next with reference to FIG. 18. FIG. 18 shows the content of the terminal program 60. The terminal program 60 has a game status updating module 70, a sharer determination module 71, a relationship establishment notification module 72, and a shared information output module 73. Each user terminal 20 reads the terminal program 60 stored in the storage 22 and executes it with the processor 21, thereby realizing the functions of each user terminal 20.

The game status updating module 70 has a function to update the game status data 61 based on game status data sent from the server apparatus 10 as well as update the game status data 61 specific to the relevant user based on an operation input to the user's user terminal 20.

The sharer determination module 71 has a function to determine whether to establish a sharer relationship between a user of a user terminal 20 and another user participating in a session or not. The sharer determination module 71 determines to establish a sharer relationship between the user of the user terminal 20 and the user of the other user terminal 20 when a character controlled by the user of the user terminal 20 and a character controlled by the user of the other user terminal 20 get closer than the predetermined criterion in the virtual space.

In the embodiment, the predetermined criterion is a threshold of the distance in the virtual space, and a sharer relationship is established when the distance between characters gets shorter than the threshold. Note that the distance used as the predetermined criterion may be variable. For example, the determination of a sharer may be made on the basis of a first distance when a user's character's environment is brighter than a predetermined threshold, and on the basis of a second distance that is shorter than the first distance when the user's character's environment is darker than the predetermined threshold.

The relationship establishment notification module 72 has a function to notify a user of a user terminal 20 that a sharer relationship is established when a sharer relationship is established between the user of the user terminal 20 and a user of another user terminal 20. Various methods can be adopted for notifying of a sharer relationship. For example, an expression may be displayed in which a character controlled by a user and another character controlled by another user with whom a sharer relationship is established are connected with a line, a message indicating the establishment of a sharer relationship may be displayed, or the notification may be given with a sound.

Figure 19:
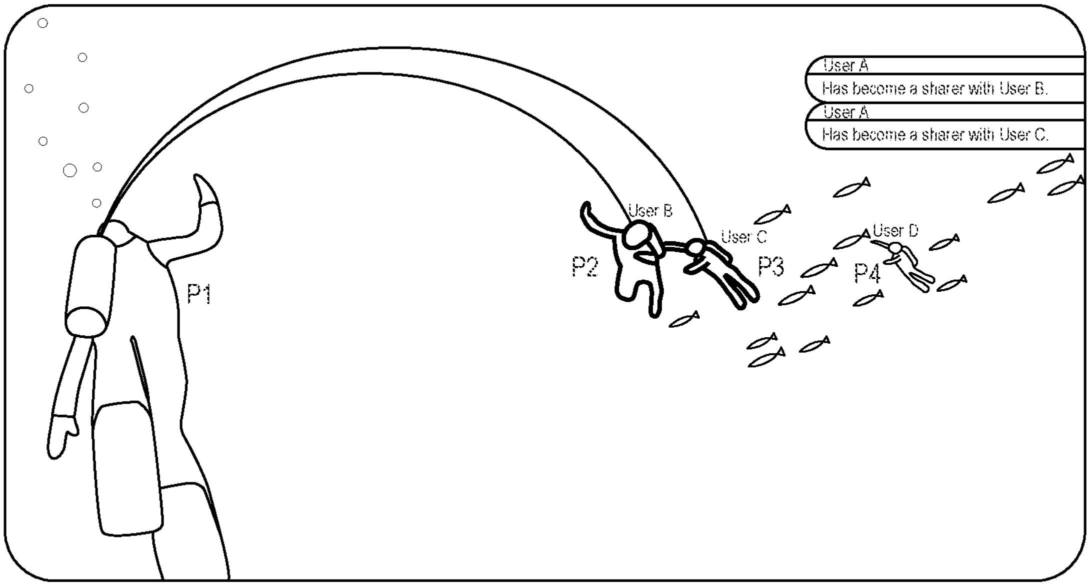
FIG. 19 shows an example of an image indicating the establishment of a sharer relationship.

FIG. 19 shows an example of an image indicating the establishment of a sharer relationship. Characters P1 to P4 are displayed in FIG. 19. Of these characters, the character P1 belongs to a user of a user terminal 20 that is displaying the image shown in FIG. 19. The characters P1 and P2 and the characters P1 and P3 are each connected to each other with a line, which indicates that a sharer relationship is established between the users of the characters P1 and P2 and between the users of the characters P1 and P3. Each line is displayed temporality when a sharer relationship is established, and is erased after a certain period of time (e.g., several seconds) has passed.

A message saying "Has become a sharer with User B" is also displayed in the upper right of the screen shown in FIG. 19. "User A" and "User B" are the names of users, where "User A" is the name of the user of the user terminal 20 that is displaying the image shown in FIG. 19. The message in FIG. 19 indicates that a sharer relationship has been established between "User A" and "User B." Similarly, a message saying "Has become a sharer with User C" indicates that a sharer relationship has been established between "User A" and "User C." This message, too, is a display indicating the establishment of a sharer relationship. Each message is also displayed temporality when a sharer relationship is established, and is erased after a certain period of time (e.g., several seconds) has passed.

While FIG. 19 shows the example in which the display of lines connecting characters to one another and the display of messages are both given as a display indicating the establishment of a sharer relationship, lines only or messages only are both acceptable.

Returning to FIG. 18, the terminal program 60 will be described. The shared information output module 73 has a function to output, to its user terminal 20 as shared information, part of game status data of another user with whom a sharer relationship is established. User-specific game status data, among game status data, does not require to be synchronized with other user terminals 20 as described above, but individual game status data is shared with another user who is in a sharer relationship so that the user can feel connected to the other user. Individual game status data, however, does not require to be shared entirely. Data shared as shared information in the embodiment will be described below.

Figure 20:
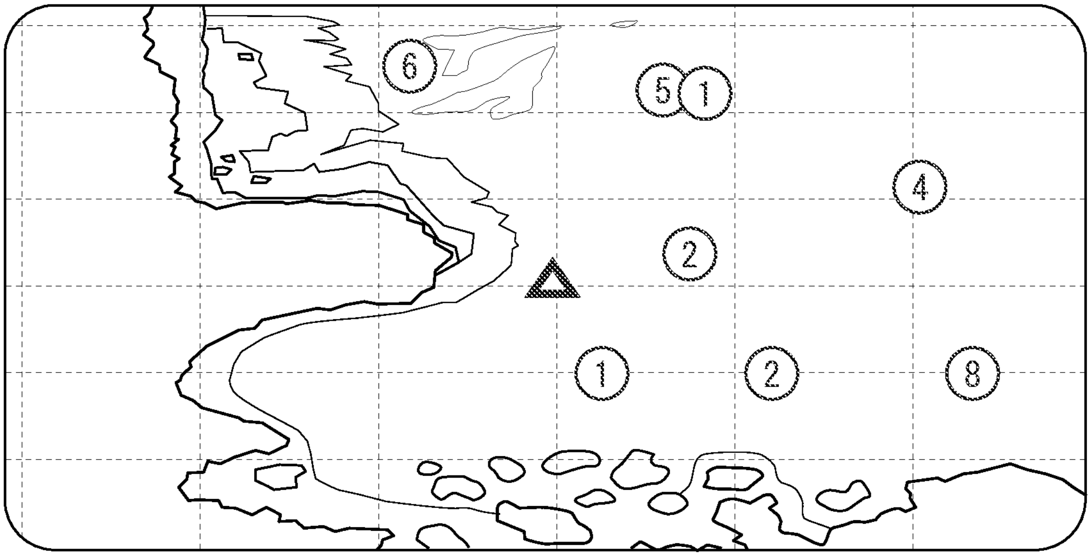
FIG. 20 shows an example of a map on which the positions of sharers are displayed.

An example of shared information is information indicating the position of a character. FIG. 20 shows an example of a map on which the positions of characters of sharers are displayed. The position indicated with a triangle is the position of a character of a user of a user terminal 20 that is displaying the map, and the positions indicated with circles indicate the positions of characters of users who are in sharer relationships. Displaying the positions of sharers on a map like this allows the user to grasp where the sharers are at a glance.

Another example of shared information is information on environmental objects found by a user of another user terminal 20. For example, when a second user finds a rare living thing or treasure, information on the position and degree of rarity of the living thing or treasure is displayed. This encourages competition, or provides a clue to exploration about where to explore in order to find a rare living thing or treasure. A further example of shared information is an emote icon given by a user of another user terminal 20 to an environmental object such as a living thing.

Some methods for the shared information output module 73 to realize the acquisition and outputting of shared information may be as follows. One method is that each user terminal 20 receives game status data of session participant users entirely from the server apparatus 10 in advance, and the shared information output module 73 extracts shared information from game status data specific to the participant users and outputs it. Another method is that the shared information output module 73 causes its user terminal 20 to send data indicating a sharer to the server apparatus 10, extracts shared information from the sharer's user-specific game status data sent from the server apparatus 10, and outputs it on the user terminal 20. While two methods are cited here, the method of outputting shared information is not limited to the methods describe above.

Figure 21:
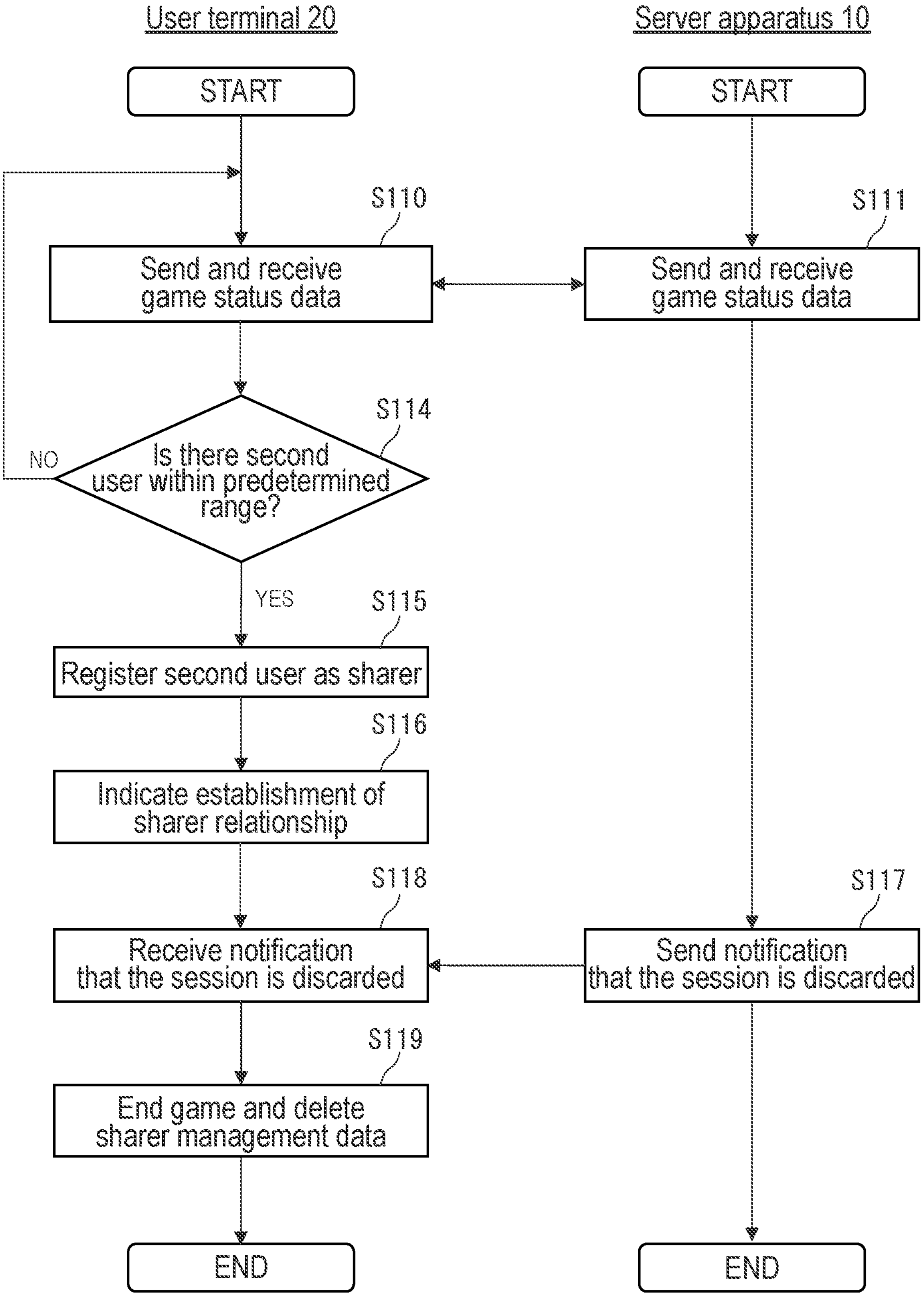
FIG. 21 shows an operation of the information processing system related to registration and discarding of a sharer.

FIG. 21 shows an operation of the information processing system 3 for registering and discarding a sharer. The flow shown in FIG. 21 starts in a state where a user terminal 20 already participates in a session. The server apparatus 10 establishes communications with a user terminal 20 of a user who joined a session, and sends and receives game status data (S110 and S111). The server apparatus 10 sends game status data required to realize multiplay to each user terminal 20, and synchronizes game statuses of the user terminals 20. Each user terminal 20 sends, to the server apparatus 10, game status data updated based on an operation input.

The user terminal 20 determines whether there is a character controlled by a user of another user terminal within a predetermined range of a character controlled in the virtual space of the game by the other user or not (S114). If there is no character of the other user within the predetermined range (NO at S114), the user terminal 20 returns to the process of updating game status (S110 and S111). That is, the user terminal 20 determines whether another character has entered the predetermined range or not while performing game control.

If there is a character within the predetermined range (YES at S114), the user terminal 20 registers the other user as a sharer (S115). After registering the sharer, the user terminal 20 outputs an image indicating the establishment of a sharer relationship with the second user (FIG. 19) (S116).

The user terminal 20 outputs shared information of the other user with whom a sharer relationship is established, and this operation will be described with reference to FIG. 22. When a predetermined period of time has passed since the start of the session, the server apparatus 10 sends notification that the session is discarded to user terminals 20 of users participating in the session (S117). Upon receiving the data on discarding of the session (S118), the user terminal 20 terminates the game of the session as well as deletes the sharer management data 62 (S119).

Figure 22:
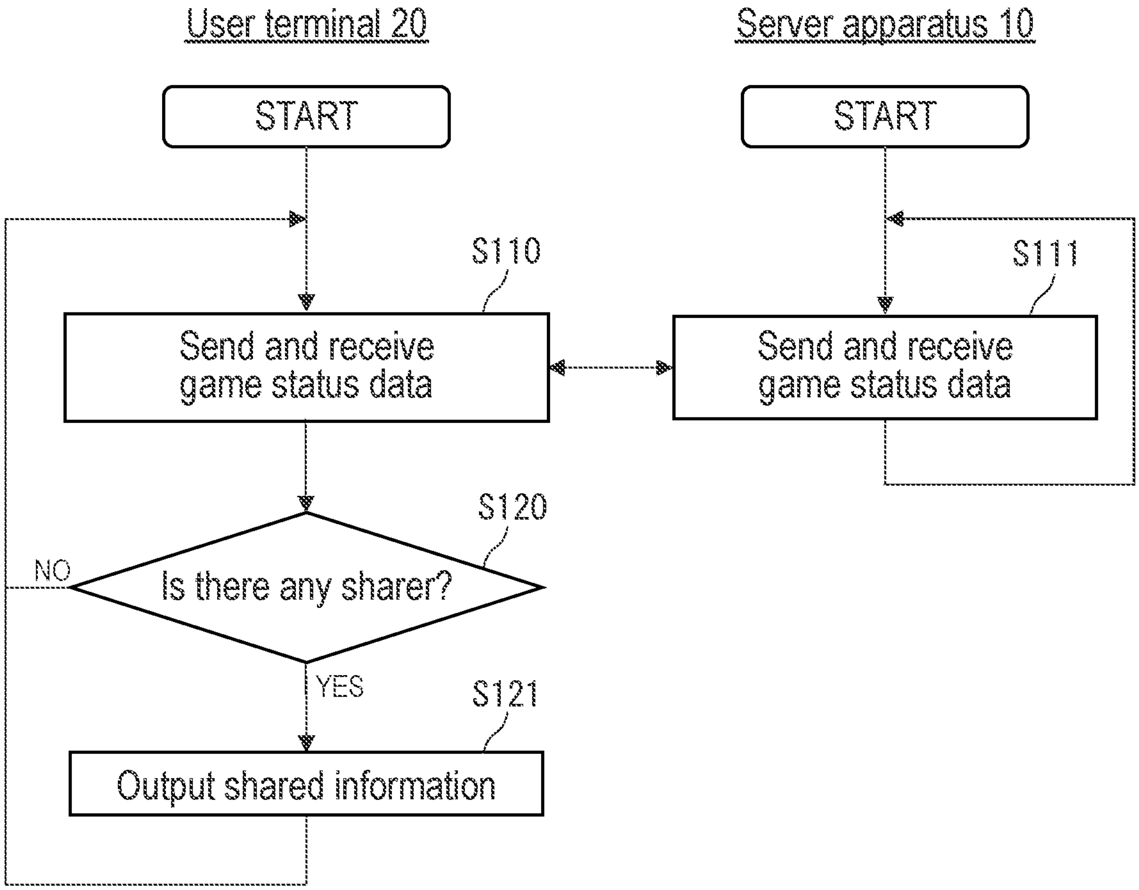
FIG. 22 shows an operation of the information processing system for outputting shared information.

FIG. 22 is a flowchart showing an operation of the information processing system 3 for outputting shared information. The operation of a user terminal 20 and the server apparatus 10 sending and receiving the game status data 61 to and from each other to update the game status data 61 of the user terminal 20 is the same as the flow described with FIG. 21. The user terminal 20 determines whether there is a sharer or not (S120) and, if there is a sharer (YES at S120), outputs shared information (S121). The user terminal 20 outputs the position of a character of a user of another user terminal 20 on a map, or outputs information such as the position or degree of rarity of a living thing, treasure, or the like found by a user of another user terminal 20, as shared information.

The above is a description of the information processing system 3 of the third embodiment. The information processing system 3 of the third embodiment establishes a sharer relationship when the distance between users' characters satisfies the predetermined criterion, and causes the sharers to share part of user-specific game status data as shared information. This allows a user to feel a connection as the user is playing the game together with a sharer. A user does not feel bothered since a sharer relationship is deleted when a session ends. The realization of such moderate connection with other users allows a user to keep an appropriate distance from other users.

While the embodiment has been described with the example in which shared information is displayed on each user terminal 20 and the information is shared between sharers, what can be done between sharers is not limited to sharing of user-specific game status data. For example, a character of a user may be transferred (caused to warp) to the position of a character of a sharer user through accepting operations for specifying the sharer positioned on a map and for transfer. This configuration allows a user to explore easily with the presence of a sharer as well as get a feeling that the user is playing together with the sharer.

While the embodiment has been described with the example in which an emote icon given by a sharer user to an environmental object such as a living thing is displayed when a sharer relationship is established, an icon used by a sharer may be added to a collection so that it can be used.

Emote icons will be described first. Emote icons that can be used by a user are stored in the storage 22. When a user of a user terminal 20 gives an emote icon to an environmental object such as a living thing and geographical features, the icons stored in the storage 22 are read and displayed as candidates. The user chooses a desired icon from the displayed candidate icons. The icons stored in the storage 22 can be increased by acquiring as rewards for events or the like, or by acquiring by purchase.

In a variation of the embodiment, if an emote icon is used by a sharer user and is displayed on a user terminal 20, the user terminal 20 acquires the icon and stores it in the storage 22. In other words, displaying an icon used by a sharer becomes one of channels for acquiring icons.

There may be a configuration in which a restriction can be set on a sharer relationship in the information processing system 3 of the embodiment. A sharer relationship is not established when a character of a user who has set the restriction gets closer than the predetermined criterion. A character of a user who has set the restriction may be displayed in a mode different from that for a character of a user who has not set the restriction so that the restriction being set is apparent. This configuration allows for meeting a request even from users who want to explore without help of other users.

We claim:

1. A non-transitory storage medium containing information processing instructions to be executed by a computer of a first terminal of a first user, wherein when executed by the computer, the information processing instructions cause the computer to participate in a session and run a game via a network, and to perform operations of:

updating game status based on an operation input from the first user;

identifying a relative position in a virtual space between a first character controlled in the virtual space by the first user and a second character controlled in the virtual space by a second user of a second terminal participating in the same session as the first terminal;

when the relative position is less than a distance, establishing a relationship in the session between the first user and the second user;

in response to establishing the relationship, sending to a server, an indication that the relationship with the second user is established and receiving filtered game status information from the server updated based on an operation input from the second user whose relationship with the first user has been established and outputting successively information received from the server during progress of the game as information indicating the game status of the second user updated based on operation input from the second user whose relationship with the first user has been established or receiving from the server game status information updated based on operations from each participant of the session, and filtering the game status information received from the server to selectively output during the progress of the game, successively, information indicating the game status of the second user updated based on operation input from the second user whose relationship with the first user has been established; and deleting the relationship between the first user and the second user, when the session is discarded.

2. The non-transitory storage medium according to claim 1, wherein when executed by the computer, the information processing instructions cause the computer to output positional information indicating a position in the virtual space of the second character of the second user whose relationship with the first user has been established, as the information indicating the game status of the second user.

3. The non-transitory storage medium according to claim 2, wherein when executed by the computer, the information processing instructions cause the computer to transfer the first character with reference to the position of the second character of the second user whose relationship with the first user has been established, in response to a transfer operation done by the first user.

4. The non-transitory storage medium according to claim 1, wherein when executed by the computer, the information processing instructions cause the computer to output operation input information corresponding to an operation input for an environmental object placed in the virtual space given by the second user whose relationship with the first user has been established, as the information indicating the game status of the second user.

5. The non-transitory storage medium according to claim 4, wherein when executed by the computer, the information processing instructions cause the computer to add the operation input information of the second user output on the first terminal to a storage unit, and to output the operation input information stored in the storage unit as a candidate for operation input information that can be input, when accepting an operation input for an environmental object from the first user.

6. The non-transitory storage medium according to claim 1, wherein when executed by the computer, the information processing instructions cause the computer to output information indicating the establishment of the relationship when establishing the relationship between the first user and the second user.

7. The non-transitory storage medium according to claim 1, wherein the relationship is not established between the first user of the first terminal and the second user of the second terminal participating in the session when the first terminal joins the session.

8. The non-transitory storage medium according to claim 1, wherein when executed by the computer, the information processing instructions cause the computer not to establish the relationship between the first user and the second user even when the relative position between the first character and the second character gets shorter than the distance if a restriction is set for the first terminal.

9. The non-transitory storage medium according to claim 1, wherein the session is discarded when a predetermined time has passed.

10. The non-transitory storage medium according to claim 1, wherein when executed by the computer, the information processing instructions cause the computer to maintain the relationship between the first user and the second user regardless of the relative position when the relationship is established.

11. The non-transitory storage medium according to claim 1, wherein when executed by the computer, the information processing instructions cause the computer to generate an indication for temporary display indicating that the relationship between the first user and the second user has been established; and cause the display of the indication which is superposed on the virtual space, the indication connecting the first character and the second character, wherein after a time, the indication is removed from the display.

12. The non-transitory storage medium according to claim 1, wherein when executed by the computer, the information processing instructions cause the computer to maintain the relationship between the first user and the second user regardless of whether the second user is offline or online while the session remains active.

13. An information processing apparatus of a first terminal of a first user for performing a process to participate in a session and run a game via a network, the information processing apparatus comprising:

a communication interface configured to communicate with a server via the network;

a memory configured to store data associated with the game;

user interface configured to receive an operation input from the first user; and one or more processors configured to:

update game status based on the operation input from the first user via the user interface;

identify a relative position in a virtual space between a first character controlled in the virtual space by the first user via the user interface and a second character controlled in the virtual space by a second user of a second terminal participating in the same session as the first terminal;

when the relative position is less than a distance, establish a relationship in the session between the first user and the second user;

in response to the relationship being established, send to the server, an indication that the relationship with the second user is established and receive filtered game status information from the server updated based on an operation input from the second user whose relationship with the first user has been established and output successively information received from the server during progress of the game as information indicating the game status of the second user updated based on operation input from the second user whose relationship with the first user has been established or receive from the server, game status information updated based on operations from each participant of the session, and filter the game status information received from the server to selectively output during the progress of the game, successively, information indicating the game status of the second user updated based on operation input from the second user whose relationship with the first user has been established; and delete the relationship between the first user and the second user, when the session is discarded.

14. An information processing method for an information processing apparatus of a first terminal of a first user for performing a process to participate in a session and run a game via a network, the information processing method comprising:

updating game status based on an operation input from the first user;

identifying a relative position in a virtual space between a first character controlled in the virtual space by the first user and a second character controlled in the virtual space by a second user of a second terminal participating in the same session as the first terminal;

when the relative position is less than a distance, establishing a relationship in the session between the first user and the second user;

in response to establishing the relationship, sending to a server, an indication that the relationship with the second user is established and receiving filtered game status information from the server updated based on an operation input from the second user whose relationship with the first user has been established and outputting successively information received from the server during progress of the game as information indicating the game status of the second user updated based on operation input from the second user whose relationship with the first user has been established or receiving from the server, game status information updated based on operations from each participant of the session, and filtering the game status information received from the server to selectively output during the progress of the game, successively, information indicating the game status of the second user updated based on operation input from the second user whose relationship with the first user has been established; and deleting the relationship between the first user and the second user, when the session is discarded.

15. The information processing method according to claim 14, wherein the information processing apparatus outputs positional information indicating a position in the virtual space of the second character of the second user whose relationship with the first user has been established, as the information indicating the game status of the second user.

16. The information processing method according to claim 15, wherein the information processing apparatus transfers the first character with reference to the position of the second character of the second user whose relationship with the first user has been established, in response to a transfer operation done by the first user.

17. The information processing method according to claim 14, wherein the information processing apparatus outputs operation input information corresponding to an operation input for an environmental object placed in the virtual space given by the second user whose relationship with the first user has been established, as the information indicating the game status of the second user.

18. The information processing method according to claim 17, wherein the information processing apparatus adds the operation input information of the second user output on the first terminal to a storage unit, and outputs the operation input information stored in the storage unit as a candidate for operation input information that can be input, when accepting an operation input for an environmental object from the first user.

19. An information processing system comprising: a server apparatus for performing processing of a game based on an operation input from a user of a user terminal participating in a session; a first terminal of a first user participating in the session; and a second terminal of a second user participating in the same session as the first terminal, wherein the first terminal updates game status based on an operation input from the first user and sends information indicating the game status of the first user to the server apparatus, wherein the second terminal updates game status based on an operation input from the second user and sends information indicating the game status of the second user to the server apparatus, wherein the server apparatus identifies a relative position in a virtual space between a first character controlled in the virtual space by the first user and a second character controlled in the virtual space by the second user of the second terminal participating in the same session as the first terminal and establishes a relationship in the session between the first user and the second user when the relative position is less than a distance, based on the information indicating the game status of the first user sent from the first terminal and on the information indicating the game status of the second user sent from the second terminal, filters game status information received from all participants in the session and transmits respective filtered game status information to the first terminal and the second terminal, wherein the first terminal, during progress of the game, successively outputs the information indicating the game status of the second user updated based on an operation input from the second user whose relationship with the first user has been established based on the respective filtered game status information received from the server apparatus, and wherein the second terminal, during progress of the game, successively outputs the information indicating the game status of the first user updated based on an operation input from the first user whose relationship with the second user has been established based on the respective filtered game status information received from the server apparatus, or wherein the server apparatus transmits game status information received from all participants in the session, wherein the first terminal, filters the game status information received from the server apparatus to during progress of the game, successively outputs selected information indicating the game status of the second user updated based on an operation input from the second user whose relationship with the first user has been established; and wherein the second terminal, filters the game status information received from the server apparatus to during progress of the game, successively outputs selected information indicating the game status of the first user updated based on an operation input from the first user whose relationship with the second user has been established, and wherein the server apparatus deletes the relationship between the first user and the second user, when the session is discarded.

20. The information processing system according to claim 19, wherein the first terminal outputs positional information indicating a position in the virtual space of the second character of the second user whose relationship with the first user has been established, as the information indicating the game status of the second user.

* * * * *